(12) United States Patent
Kato et al.

(10) Patent No.: US 7,937,346 B2
(45) Date of Patent: May 3, 2011

(54) CALCULATION PROCESSING APPARATUS AND METHOD

(75) Inventors: Masami Kato, Sagamihara (JP);
Takahisa Yamamoto, Kawasaki (JP);
Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/663,687

(22) PCT Filed: Jun. 11, 2008

(86) PCT No.: PCT/JP2008/061081
§ 371 (c)(1),
(2), (4) Date: Dec. 8, 2009

(87) PCT Pub. No.: WO2008/153194
PCT Pub. Date: Dec. 18, 2008

(65) Prior Publication Data
US 2010/0223219 A1 Sep. 2, 2010

(30) Foreign Application Priority Data
Jun. 15, 2007 (JP) .................................. 2007-159491

(51) Int. Cl.
*G06N 3/04* (2006.01)
(52) U.S. Cl. .............. 706/27; 706/15; 706/26; 382/155; 382/156; 382/157; 382/158
(58) Field of Classification Search ........................ None
See application file for complete search history.

(56) References Cited

U.S. PATENT DOCUMENTS 5,220,559 A    6/1993   Tsuzuki et al. ................. 370/60
(Continued)

FOREIGN PATENT DOCUMENTS

JP    03-055658    3/1991
(Continued)

OTHER PUBLICATIONS

Korekado et al., "An Image Filtering Processor for Face/Object Recognition Using Merged/Mixed Analog-Digital Architecture", Symposium on VLSI Circuits Digest of Technical Papers, pp. 220-223 (2005).

*Primary Examiner* — Omar F Fernandez Rivas
(74) *Attorney, Agent, or Firm* — Fitzpatrick, Cella, Harper & Scinto

(57) ABSTRACT

A calculation processing apparatus for executing network calculations defined by hierarchically connecting a plurality of logical processing nodes that apply calculation processing to input data, sequentially designates a processing node which is to execute calculation processing based on sequence information that specifies an execution order of calculations of predetermined processing units to be executed by the plurality of processing nodes, so as to implement the network calculations, and executes the calculation processing of the designated processing node in the processing unit to obtain a calculation result. The calculation apparatus allocates partial areas of a memory to the plurality of processing nodes as ring buffers, and writes the calculation result in the memory while circulating a write destination of data to have a memory area corresponding to the amount of the calculation result of the processing unit as a unit.

21 Claims, 22 Drawing Sheets

U.S. PATENT DOCUMENTS

| | | | |
|---|---|---|---|
| 6,038,337 A | 3/2000 | Lawrence et al. | 382/156 |
| 7,016,529 B2 * | 3/2006 | Simard et al. | 382/155 |
| 7,028,271 B2 * | 4/2006 | Matsugu et al. | 716/107 |
| 7,676,441 B2 * | 3/2010 | Matsugu et al. | 706/20 |
| 7,747,070 B2 * | 6/2010 | Puri | 382/157 |
| 2002/0181765 A1 * | 12/2002 | Mori et al. | 382/158 |
| 2003/0002731 A1 * | 1/2003 | Wersing et al. | 382/161 |
| 2003/0179927 A1 | 9/2003 | Nagao | 382/173 |
| 2004/0046773 A1 | 3/2004 | Inoue et al. | 345/698 |
| 2005/0185835 A1 * | 8/2005 | Matsugu et al. | 382/159 |

FOREIGN PATENT DOCUMENTS

| | | |
|---|---|---|
| JP | 2679730 | 11/1997 |
| JP | 10-021406 | 1/1998 |
| JP | 10-162120 | 6/1998 |
| JP | 11-184841 | 7/1999 |
| JP | 2002-358500 | 12/2002 |
| JP | 2003-281518 | 10/2003 |
| JP | 2004-101910 | 4/2004 |

* cited by examiner

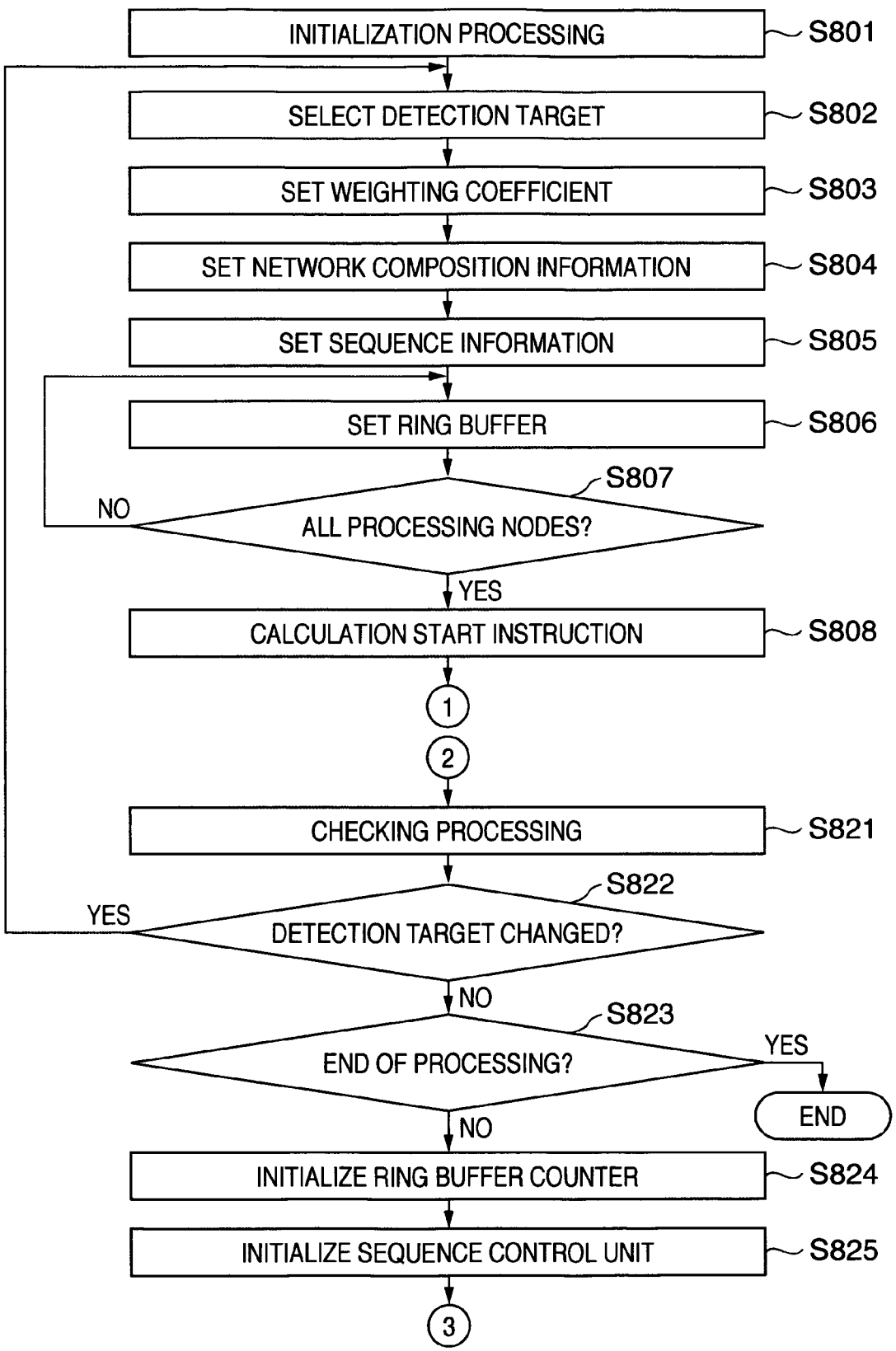

FIG. 9

| DESIGNATED PROCESSING NODE | NUMBER OF CONNECTED NODES | ADJACENT LOWER LAYER PROCESSING NODE | CALCULATION TYPE | REFERENCE DATA WIDTH | REFERENCE DATA HEIGHT |
|---|---|---|---|---|---|
| FIRST PROCESSING NODE | 1 | ZEROTH PROCESSING NODE | CALCULATION 1 | 3 | 3 |
| SECOND PROCESSING NODE | 1 | ZEROTH PROCESSING NODE | CALCULATION 2 | 3 | 3 |
| THIRD PROCESSING NODE | 1 | ZEROTH PROCESSING NODE | CALCULATION 3 | 3 | 3 |
| FOURTH PROCESSING NODE | 3 | FIRST PROCESSING NODE | CALCULATION 4 | 6 | 6 |
| | | SECOND PROCESSING NODE | CALCULATION 5 | 6 | 6 |
| | | THIRD PROCESSING NODE | CALCULATION 6 | 6 | 6 |
| FIFTH PROCESSING NODE | 3 | FIRST PROCESSING NODE | CALCULATION 7 | 9 | 9 |
| | | SECOND PROCESSING NODE | CALCULATION 8 | 9 | 9 |
| | | THIRD PROCESSING NODE | CALCULATION 9 | 9 | 9 |
| SIXTH PROCESSING NODE | 2 | FOURTH PROCESSING NODE | CALCULATION 10 | 15 | 15 |
| | | FIFTH PROCESSING NODE | CALCULATION 11 | 15 | 15 |

FIG. 10

| SEQUENCE NUMBER | PROCESSING NODE NUMBER |
|---|---|
| 1 | 1 |
| 2 | 2 |
| 3 | 3 |
| 4 | 1 |
| 5 | 2 |
| 6 | 3 |
| . | . |
| . | . |
| . | . |
| 34 | 1 |
| 35 | 2 |
| 36 | 3 |
| 37 | 4 |
| 38 | 5 |
| 39 | 1 |
| 40 | 2 |
| 41 | 3 |
| 42 | 4 |
| 43 | 5 |
| 44 | 1 |
| . | . |
| . | . |
| . | . |
| 600 | 1 |
| 601 | 2 |
| 602 | 3 |
| 603 | 4 |
| 604 | 5 |
| 605 | 6 |

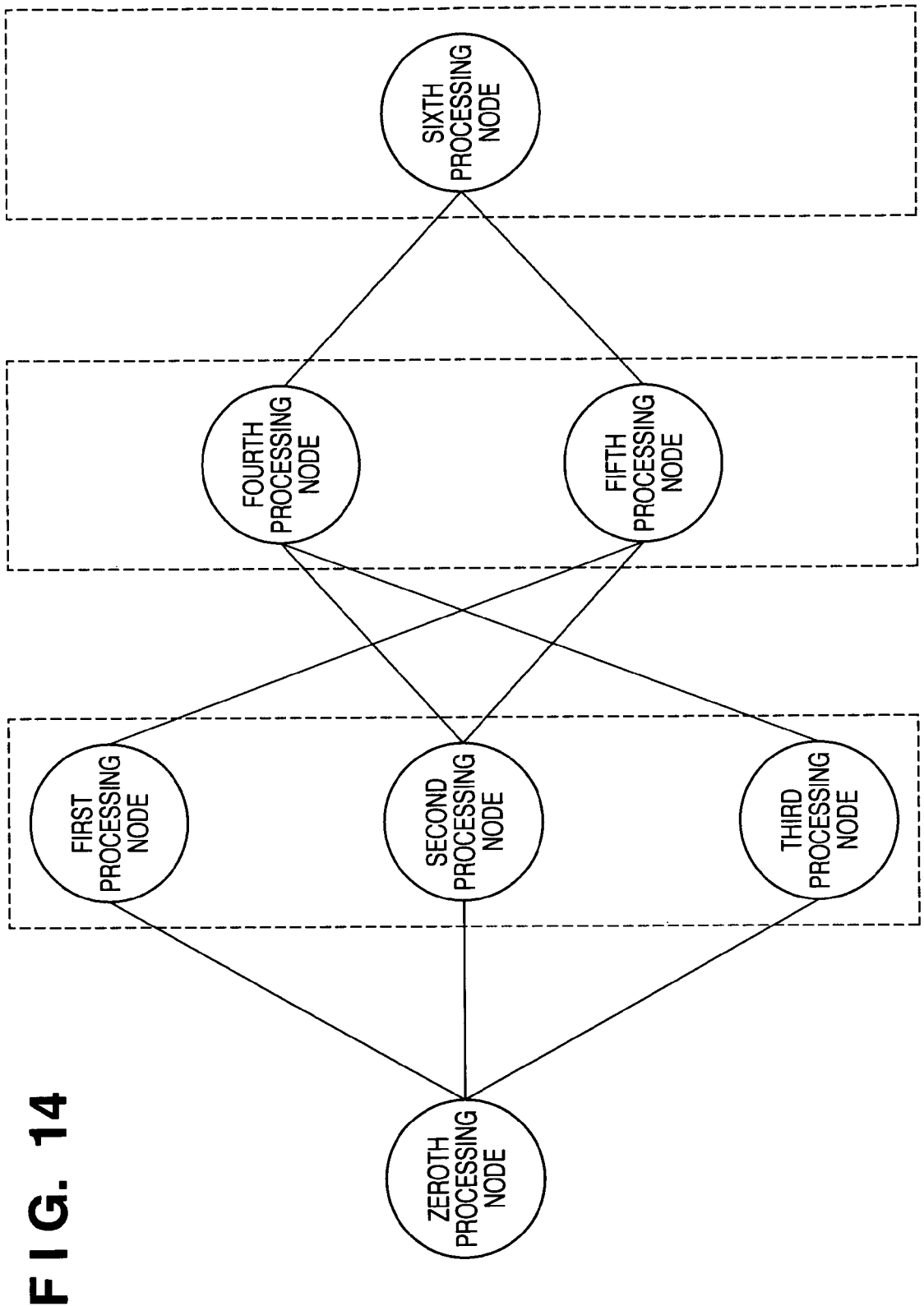
F I G. 14

CALCULATION PROCESSING APPARATUS AND METHOD

TECHNICAL FIELD

The present invention relates to a hierarchical calculation processing method and apparatus, which are applied to a pattern identification apparatus, pattern identification system, hierarchical filter calculation processing apparatus, and the like.

BACKGROUND ART

As applications to a pattern identification system, prediction system, control system, and the like, a signal processing apparatus using a neural network is prevalently used. The neural network is often implemented as software which runs on a microprocessor, and is provided as application software for a personal computer, workstation, and the like.

FIG. 2 is a schematic diagram showing an example of the arrangement of an image processing apparatus using a general layer-interconnected neural network. Reference numeral 21 denotes, for example, raster-scanned image data as a detection target. A calculation unit 22 comprises a neural network of three layers and detects a predetermined object from the image data 21. Reference numeral 23 denotes an output data plane corresponding to the calculation result. The calculation unit 22 executes processing while scanning and referring to a predetermined image area 24 in the image data 21, thereby detecting a detection target which exists in the image data 21. The output data plane 23 is a data plane having the same size as the image data 21 as the detection target, and stores, in the scan order, detection outputs obtained when the calculation unit 22 processes all the areas of the image data 21 while scanning them. Since the calculation unit 22 outputs a large value at a position where a target is detected, it can recognize the position of the target in the image plane by scanning the output data plane 23.

In the calculation unit 22, reference numerals 25, 26, and 27 denote layers of the neural network, and a predetermined number of neurons 28 exist in each layer. The first layer 25 has the same number of neurons 28 as the number of pixels of a reference image. Respective neurons are feedforward-interconnected via predetermined weighting coefficients.

FIG. 3 shows the arrangement of one neuron 28. Reference numerals in_1 to in_n denote input values of neurons, which are output values of the previous layer neurons in the second and subsequent layers. Multipliers 31a, 31b, . . . , 31n output products obtained by multiplying the output values of the respective previous layer neurons by coefficients w_1 to w_n obtained by learning. An accumulation adder 32 accumulates the products from the multipliers 31a, 31b, . . . , 31n. A nonlinear transformation processing unit 33 nonlinearly transforms the accumulated sum from the accumulation adder 32 using a logistic function, hyperbolic tangent function (tanh function), or the like, and outputs that transformation result as a detection result "out". In the hierarchical neural network of this type, the weighting coefficients w_1 to w_n required for respective neurons are determined in advance for respective detection targets using a learning algorithm such as back propagation, or the like, which is generally known.

For the purpose of high-performance and low-cost implementation of such layer-interconnected neural network in an embedded device or the like, an implementation method of the layer-interconnected neural network using analog hardware or digital hardware has been proposed.

For example, Japanese Patent No. 2679730 (patent reference 1) discloses an architecture of a hierarchical structure neural network which implements a multilayered structure using single-layer analog neural network hardware as time division multiplexing. Also, Japanese Patent Laid-Open No. 3-55658 (patent reference 2) discloses an implementation method of implementing a neural network using digital hardware. On the other hand, a calculation method called Convolutional Neural Networks (to be abbreviated as CNN hereinafter) of neural networks is known as a method that allows pattern recognition robust against variations of an identification target. For example, Japanese Patent Laid-Open No. 10-021406 (patent reference 3) and Japanese Patent Laid-Open No. 2002-358500 (patent reference 4) have proposed examples applied to target identification or detection in an image.

FIG. 4 shows the logical network composition as an example of simple CNN. FIG. 4 shows an example of three-layer CNN in which the number of features of a first layer 406 is 3, that of a second layer 410 is 2, and that of a third layer 411 is 1. Reference numeral 401 denotes image data, which corresponds to raster-scanned image data. The image data 401 is input data to the CNN calculations. Reference numerals 403a to 403c denote feature planes of the first layer 406. The feature plane is an image data plane indicating the processing result obtained by calculations while scanning data of the previous layer using a predetermined feature extraction filter (the accumulated sum of convolution calculations and nonlinear processing). Since the feature plane is the detection result for the raster-scanned image data, the detection result is also expressed by a plane. The feature planes 403a to 403c are generated from the image data 401 by corresponding feature extraction filters. For example, the feature planes 403a to 403c are generated by nonlinearly transforming the calculation results the calculation results of the two-dimensional convolution filters 404a to 404c. Note that reference numeral 402 denotes a reference image area required for the convolution calculations of the convolution filters 404a to 404c.

For example, a convolution filter calculation having a kernel size (the length in the horizontal direction and the height in the vertical direction) of 11×11 processes data by a product-sum calculation given by:

$$\text{output}(x, y) = \sum_{row=-RowSize/2}^{rowSize/2} \sum_{column=-columnSize/2}^{columnSize/2} \text{input}(x + column, y + row) \times \text{weight}(column, row) \quad (1)$$

where
 input (x, y): a reference pixel value at coordinates (x, y)
 output (x, y): a calculation result at coordinates (x, y)
 weight (column, row): a weighting coefficient at coordinates (x+column, y+row)
 columnSize=11, rowSize=11: a filter kernel size (the number of filter taps).

The convolution filters 404a to 404c are convolution filter kernels having different coefficients. Also, the convolution kernels have different sizes depending on the feature planes.

The CNN calculations generate the feature plane by repeating the product-sum calculation while scanning a plurality of filter kernels for respective pixels, and by nonlinearly transforming the final product-sum result. Upon calculating the feature plane 403a, since the number of interconnections with the previous layer is 1, the number of filter kernels is 1 (convolution filter 404a). On the other hand, upon calculating each of feature planes 407a and 407b, since the number of interconnections with the previous layer is 3, the calculation results of three convolution filters 409a to 409c or 409d to 409f are accumulated. That is, the feature plane 407a can be generated by accumulating the outputs from the convolution filters 409a to 409c, and finally executing the nonlinear transformation processing of the sum.

Note that the convolution filters 409a to 409f are convolution kernels having different filter coefficients. The convolution filters 409a to 409c and convolution filters 409d to 409f have different kernel sizes, as shown in FIG. 4. The basic arrangement of the accumulation of convolution filters and the nonlinear transformation processing is the same as that of the neuron shown in FIG. 3. That is, the coefficients of the convolution kernels correspond to the weighting coefficients w_1 to w_n. Upon interconnecting to the feature planes of a plurality of previous layers like the feature planes 407a, 407b, and 408, the accumulation adder 32 accumulates calculation results of a plurality of convolution kernels. That is, the total number of interconnections corresponds to the convolution kernel size×the number of features of the previous layer.

FIG. 5 is a view for explaining graphic detection processing in the CNN calculations. Reference numerals 51a to 51c denote convolution kernels which illustrate feature extraction targets of the first layer, and are learned to respectively extract a horizontal edge and oblique edges. Reference numerals 52a and 52b denote graphics determined based on a plurality of feature extraction results of the first layer and their spatial allocation relationships. Reference numeral 53 denotes a graphic to be finally extracted. The graphic 53 is determined based on a plurality of second layer feature extraction results and their spatial allocation relationship. Assume that the filter coefficients of the convolution kernels are determined in advance for respective features by learning using a prevalent method such as perceptron learning, back propagation learning, or the like. In object detection, recognition, and the like, a filter kernel having a size as large as 10×10 or more is normally used. In general, convolution kernel sizes are different for respective features.

In this way, in the CNN calculations, by hierarchically interconnecting layers while holding the results by respective image planes for respective feature extractions, robust pattern detection based on primitive features and their spatial allocation relationships can be implemented.

As has been described using FIG. 2, in an apparatus for detecting an object in an image, which uses a general hierarchical neutral network, as the memory size required for calculation processing, a buffer memory used to hold neuron outputs suffices except for input and output image buffers. That is, if a memory having the predetermined number of bits as many as the number of neurons is provided, desired calculation processing can be executed.

On the other hand, in case of the CNN calculations, since feature extraction is made based on the spatial allocation of a plurality of feature extraction results of the previous layer, data buffers of a predetermined size are required between adjacent layers. For example, in case of the CNN calculation configuration shown in FIG. 4, the five feature planes 403a to 403c, and 407a and 407b (buffer memories) are required. That is, a memory size of an image size×5 is required in addition to input and output image buffers. For this reason, a memory size required for processing becomes larger than a general hierarchical neural network.

The methods disclosed in patent references 3 and 4 described above are also those which hold the feature extraction results by image planes, and the memory size required for processing is larger than a general hierarchical neural network.

As a result, particularly, upon hardware implementation of the CNN calculation configuration, a RAM (Random Access Memory) having a large size needs to be prepared in an LSI, resulting in increases in circuit scale. Even upon software implementation of the CNN calculation configuration, if it is implemented in an embedded device, the cost similarly increases due town increase in memory size required for the system.

On the other hand, as a method of avoiding an increase in memory size, a method of dividing input data into areas and inputting the divided data is used. However, when calculations with a broad reference area are to be hierarchically processed, input data needs to be divisionally input by overlapping the input data over a broad range, processing target areas increase, resulting in a processing speed drop.

DISCLOSURE OF INVENTION

The present invention has been made to solve such problems, and one typical embodiment implements, using a small memory size, hierarchical calculation processing based on the spatial allocation relationship such as the CNN calculations and the like without dividing input data.

According to one aspect of the present invention, there is provided a calculation processing apparatus hierarchically connecting a plurality of logical processing nodes that apply calculation processing to input data, the apparatus comprising: designation means for sequentially designating a processing node which is to execute calculation processing from the plurality of processing nodes based on sequence information that specifies an execution order of calculations of predetermined processing units to be executed by the plurality of processing nodes; execution means for executing the calculation processing of the processing node designated by the designation means in the processing unit to obtain a calculation result; and memory control means for allocating ring buffers to the plurality of processing nodes respectively, and writing the calculation result of the processing node obtained by the execution means in the corresponding ring buffer while circulating a write destination of data in units of the amount corresponding to the calculation result of the processing unit.

According to another aspect of the present invention, there is provided a method of controlling a calculation processing apparatus hierarchically connecting a plurality of logical processing nodes that apply calculation processing to input data, the method comprising: a designation step of sequentially designating a processing node which is to execute calculation processing from the plurality of processing nodes based on sequence information that specifies an execution order of calculations of predetermined processing units to be executed by the plurality of processing nodes; an execution step of executing the calculation processing of the processing node designated in the designation step in the processing unit to obtain a calculation result; and a memory control step of allocating ring buffers to the plurality of processing nodes respectively, and writing the calculation result of the processing node obtained in the execution step in the corresponding ring buffer while circulating a write destination of data in units of the amount corresponding to the calculation result of the processing unit as a unit.

Further features of the present invention will become apparent from the following description of exemplary embodiments with reference to the attached drawings.

BRIEF DESCRIPTION OF DRAWINGS

FIGS. 8A and 8B are a flowchart for explaining the operation of the pattern detection apparatus according to the first embodiment;

FIG. 9 is a view showing an example of the data configuration of a network composition information table;

FIG. 10 is a view showing the data configuration of a sequence information table;

FIG. 14 is a view for explaining the logical connection configuration of processing nodes;

BEST MODE FOR CARRYING OUT THE INVENTION

Exemplary embodiments of the present invention will now be described in detail in accordance with the accompanying drawings.

First Embodiment

Details of the operation of the first embodiment will be described below using FIGS. 1, 6, 7, 8A and 8B.

Figure 6:
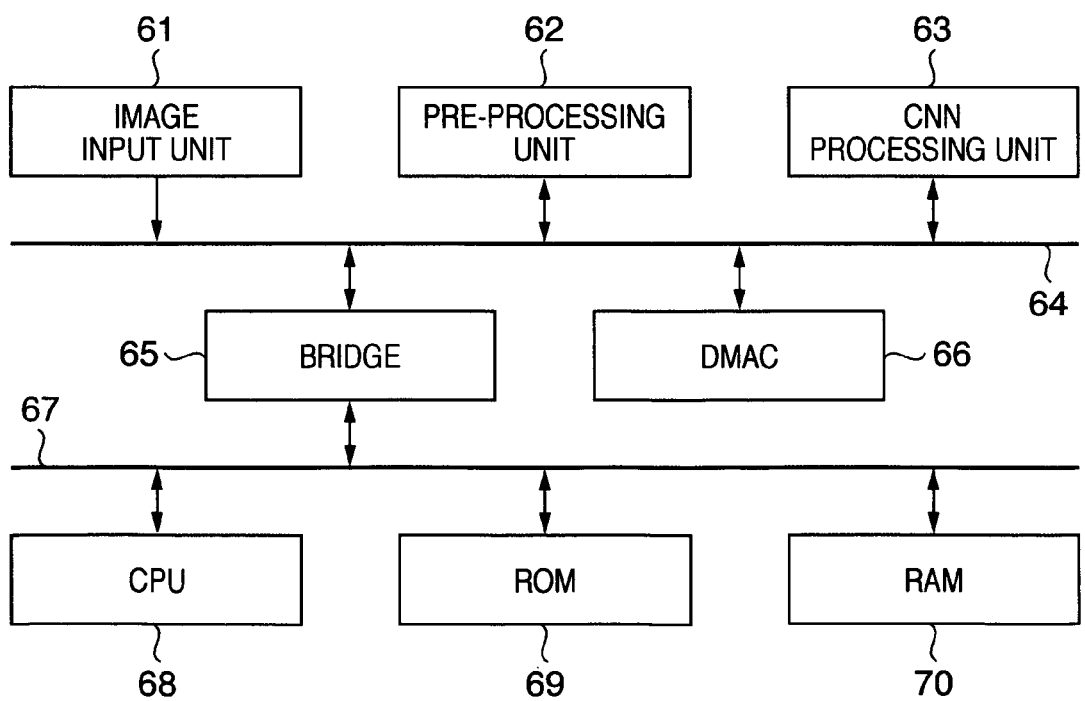
FIG. 6 is a block diagram showing an example of the arrangement of an image processing apparatus (pattern detection apparatus) using hierarchical calculation processing according to the first embodiment.

FIG. 6 is a block diagram showing an example of the arrangement of an image processing apparatus (used as a pattern detection apparatus in this embodiment), which comprises a hierarchical calculation processing circuit according to the first embodiment. The pattern detection apparatus has a function of detecting a specific object (image pattern) in image data.

Referring to FIG. 6, reference numeral 61 denotes an image input unit, which comprises an optical system and a photoelectric conversion device such as a CCD (Charge-Coupled Device) or CMOS (Complementary Metal Oxide Semiconductor) sensor, or the like. Furthermore, the image input unit 61 includes a driver circuit for controlling the photoelectric conversion device, an AD converter, a signal processing circuit for controlling various kinds of image correction, a frame buffer, and the like. Reference numeral 62 denotes a pre-processing unit, which executes various kinds of pre-processing required to efficiently execute detection processing. More specifically, the pre-processing unit 62 processes image data conversion such as color conversion processing, contrast correction processing, and the like by hardware. A CNN processing unit 63 includes a hierarchical calculation processing circuit, and serves as a feature detection processing unit. Details of the CNN processing unit 63 will be described later with reference to FIG. 1.

Reference numeral 66 denotes a DMAC (Direct Memory Access Controller), which controls data transfer between the respective processing units on an image bus 64 and that between devices on the image bus 64 and a RAM 70 on a CPU bus 67. Reference numeral 65 denotes a bridge, which provides a bridge function between the image bus 64 and the CPU bus 67. Reference numeral 68 denotes a CPU, which controls the operation of this apparatus as a whole. Reference numeral 69 denotes a ROM (Read Only Memory), which stores instructions that specify the operations of the CPU 68 and parameter data required for various calculations. For example, the ROM 69 stores weighting coefficients, network interconnection information, sequence information, and the like required for the operation of the CNN processing unit 63. The RAM (Random Access Memory) 70 is a memory required for the operation of the CPU 68. The RAM 70 comprises a memory having a relatively large capacity such as a DRAM (Dynamic RAM) or the like. The CPU 68 can access various processing units on the image bus 64 via the bridge 65. By isolating the image bus 64 and CPU bus 67, as shown in FIG. 6, the respective processing units such as the image input unit 61, pre-processing unit 62, and CNN processing unit 63 implemented by hardware can operate simultaneously with the CPU 68.

Figure 1:
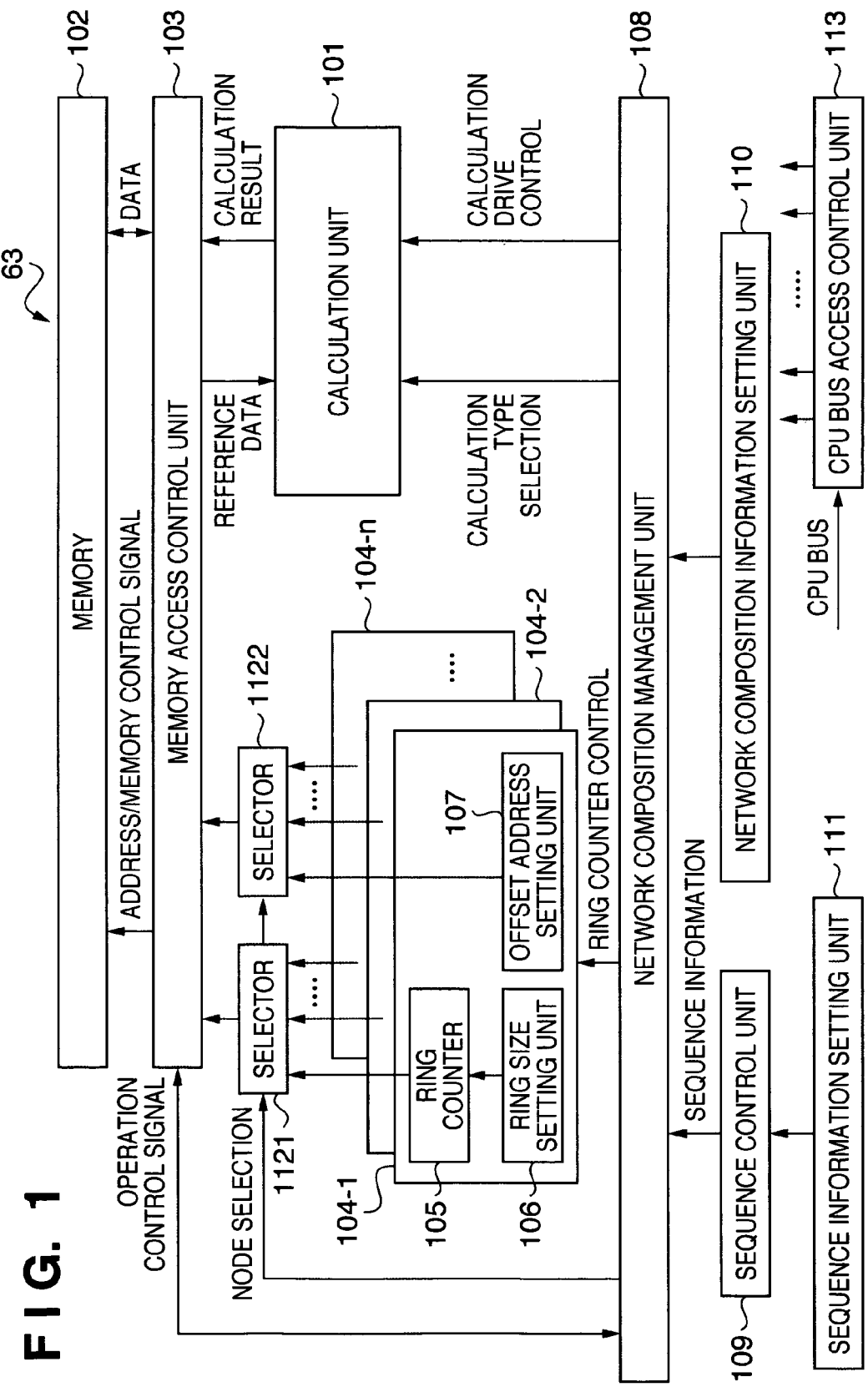
FIG. 1 is a block diagram showing an example of the arrangement of a CNN processing unit according to the first embodiment.
Figure 2:
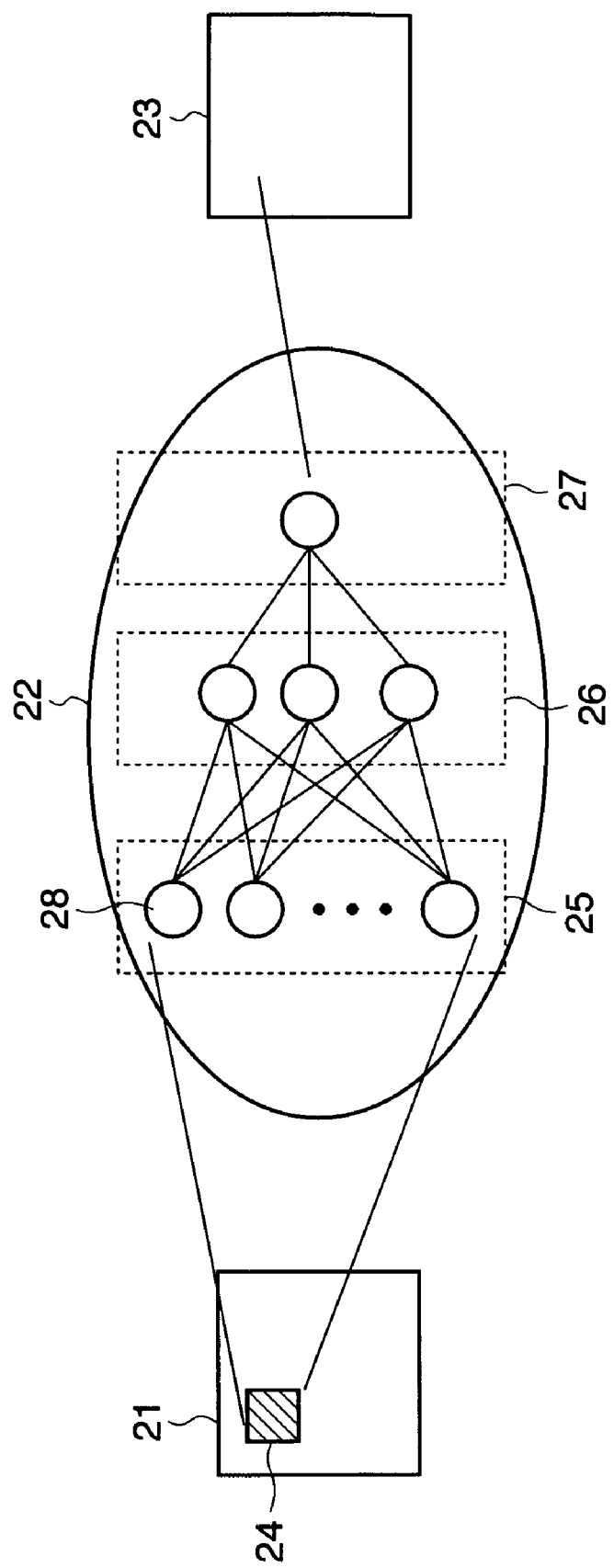
FIG. 2 is a view for explaining an example of the composition of a layer-interconnected neural network.
Figure 3:
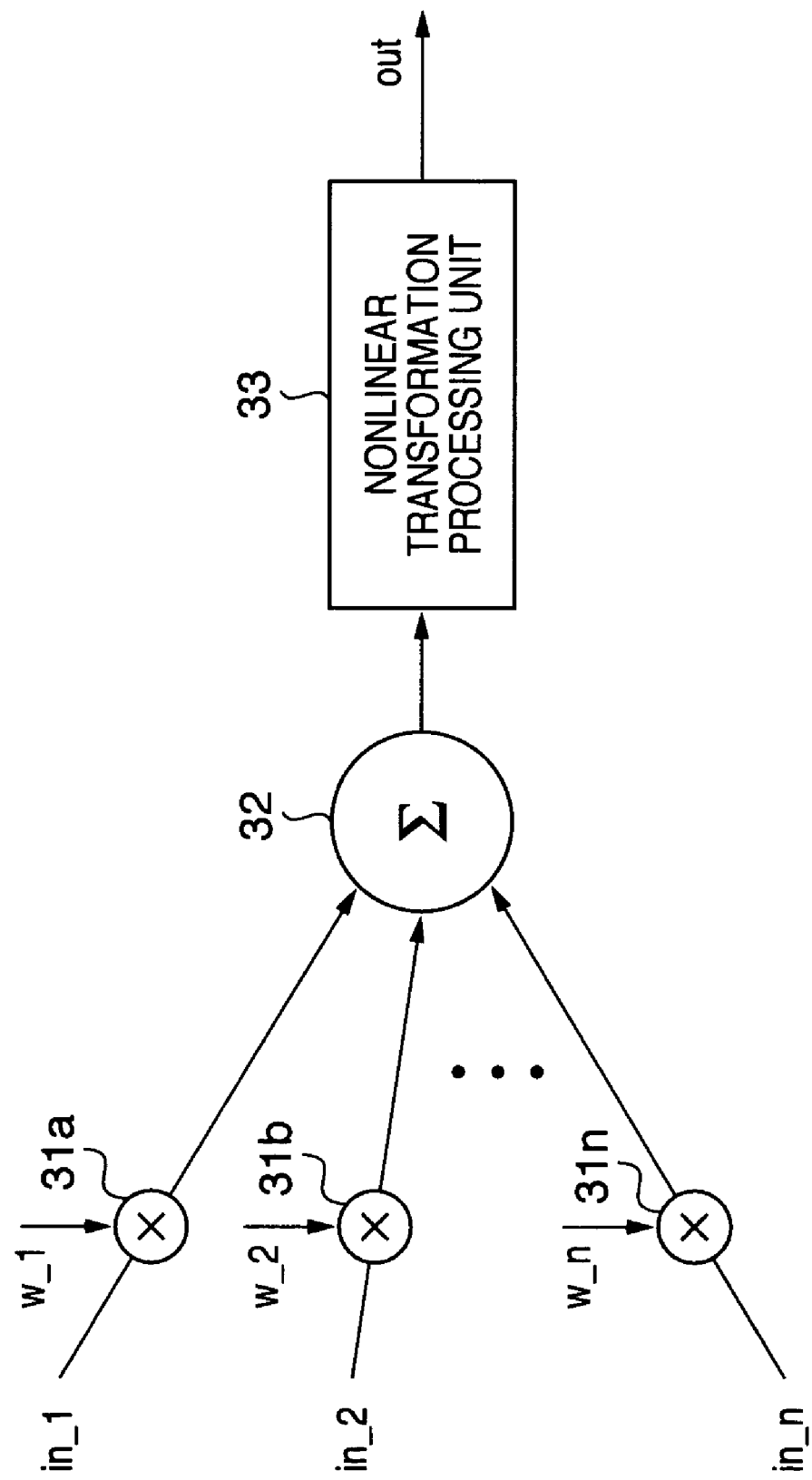
FIG. 3 is a view showing an example of the configuration of a neuron.

FIG. 1 is a block diagram showing the detailed arrangement of the CNN processing unit 63. The CNN processing unit 63 processes calculations of the overall CNN network by executing calculations corresponding to logical processing nodes (to be described later) in a time-sharing fashion in accordance with predetermined conditions.

Figure 12:
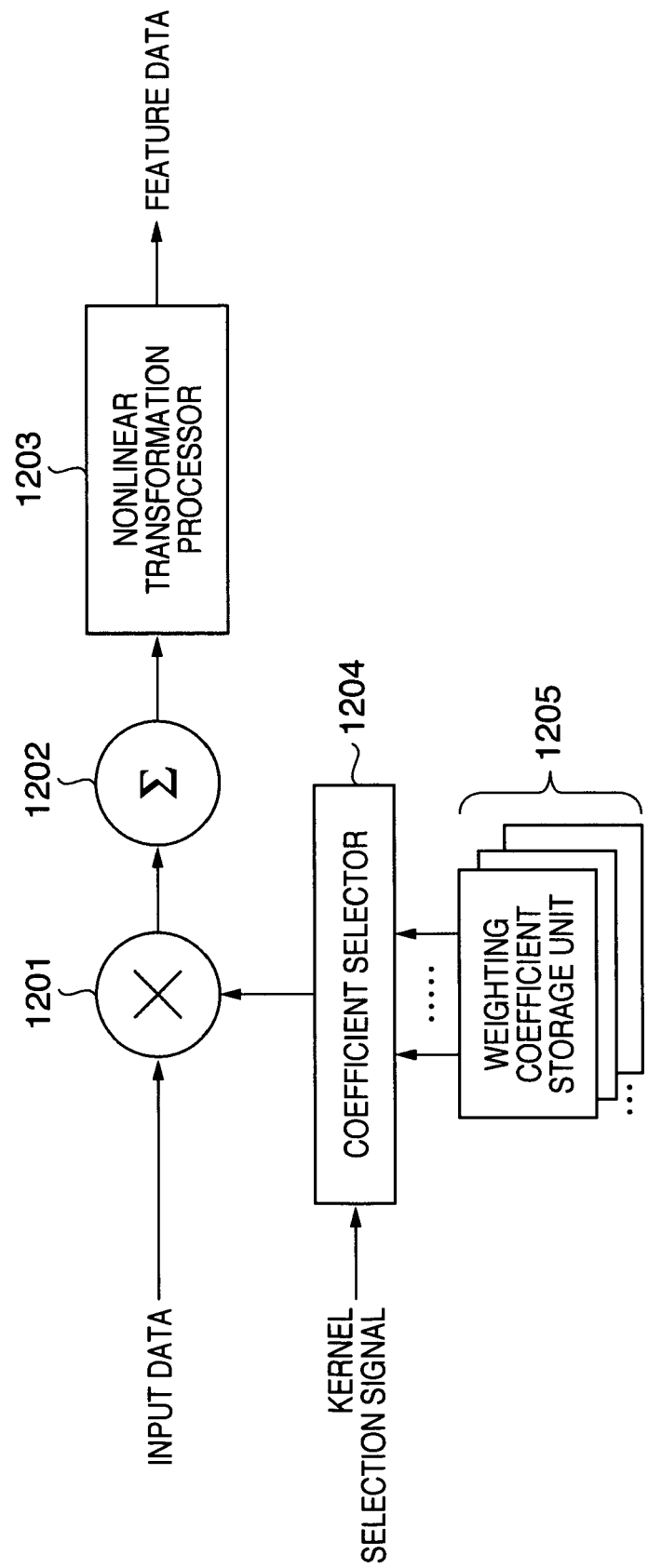
FIG. 12 is a block diagram showing an example of the arrangement of a calculation processing unit.
Figure 13:
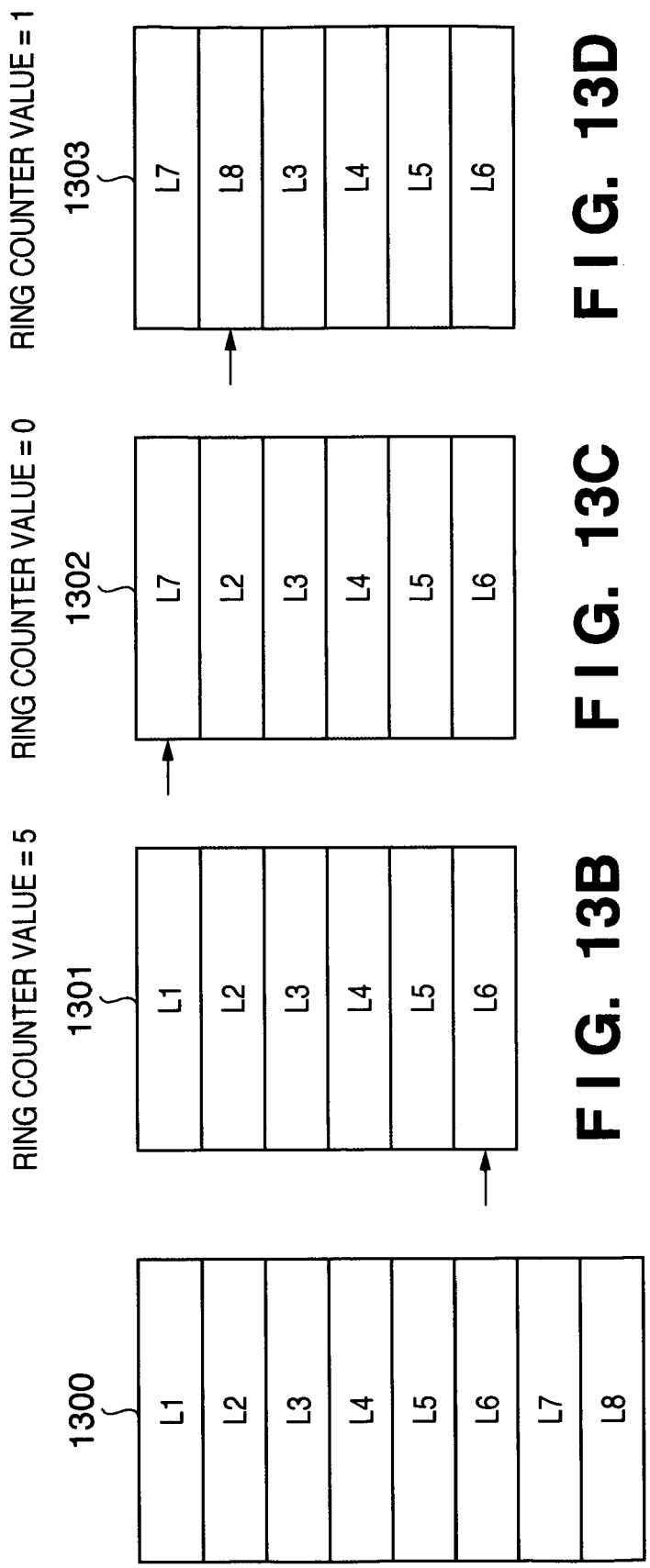
FIGS. 13A to 13D are views for explaining an example of a ring buffer.

Referring to FIG. 1, reference numeral 101 denotes a calculation unit, which executes convolution calculations and nonlinear processing for a predetermined data group. FIG. 12 shows an example of a more practical arrangement of the calculation unit 101. Referring to FIG. 12, a multiplier 1201 multiplies input data, which is synchronously input, by a weighting coefficient selected by and output from a coefficient selector 1204 in accordance with a kernel selection signal. An accumulation adder 1202 accumulates the outputs from the multiplier 1201 as many as the number of processing nodes connected to the previous stage. A nonlinear transformation processor 1203 nonlinearly transforms the accumulated sum of the accumulation adder 1202 using a logistic function or tanh function. Note that the nonlinear transformation is implemented by a function table which enumerates predetermined function values with respect to respective input values. Weighting coefficient storage units 1205 store a plurality of weighting coefficient data according to detection targets. The weighting coefficient storage units 1205 comprise a RAM or the like. The coefficient selector 1204 sequentially reads out corresponding weighting coefficients from the weighting coefficient storage units 1205 in accordance with a selection signal from a network composition management unit 108.

Figures 22A, 22B:
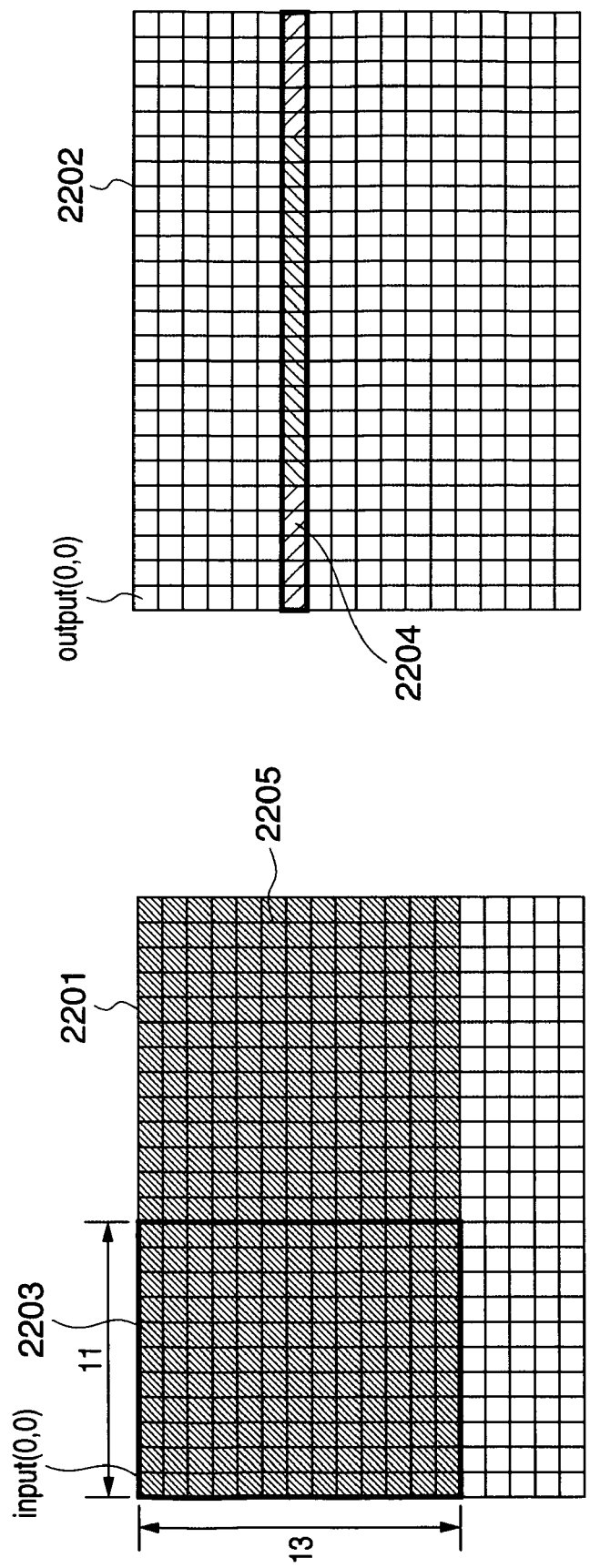
FIGS. 22A and 22B are explanatory views illustrating a state in which a calculation unit 101 executes processing for respective lines.

In this embodiment, the calculation unit 101 executes time-divisional processing for respective lines in correspondence with logical processing nodes. FIGS. 22A and 22B are explanatory views illustrating a state in which the calculation unit 101 executes processing for respective lines.

Referring to FIGS. 22A and 22B, reference numeral 2201 denotes a calculation target image (reference data plane). One minimum box illustrated in the calculation target image 2201 indicates a pixel of an input image expressed in a raster-scan order or a calculation result pixel in the processing node of the previous layer (input (x, y), x: a horizontal position, y: a vertical position). Reference numeral 2202 denotes a calculation result image. One minimum box illustrated in the calculation result image 2202 indicates a calculation result pixel in the raster-scan order (output (x, y), x: a horizontal position, y: a vertical position).

An area 2203 in the bold frame in the calculation target image 2201 indicates an area of reference data upon processing the convolution calculations at a position output (6, 7). The area 2203 indicates a case in which the convolution kernel size is defined by "11" in the horizontal direction and "13" in the vertical direction.

An area 2204 in the bold frame in the calculation result image 2202 indicates an area that stores a result of a calculation for each line (a calculation for one row in the horizontal direction) for the calculation target image 2201. Cross-hatched areas (five pixels each at the right and left ends) in the area 2204 indicate pixels in surrounding areas (areas that do not undergo any calculation) which are generated depending on the convolution kernel size. How to handle these surrounding areas (to delete, to embed a default value, or the like) in the hierarchical processing is not an essential matter in the present invention. In this case, for example, assume that a default value is embedded.

As can be seen from FIGS. 22A and 22B, upon execution of a unit calculation (for example, a calculation for one row in the horizontal direction), an area at least having a size of a hatched area 2205 in the calculation target image 2201 is required. Note that the horizontal size of the area 2205 is the same as that of the calculation target image, and its vertical size is the same as that of the convolution kernel. The convolution calculations can be made for the entire area of the calculation target image 2201 by executing the unit calculation for obtaining the calculation result data of the area 2204 while shifting the unit calculation image target area. Note that the calculation pixel, calculation result image, and calculation result data will be generically referred to as a calculation result hereinafter.

Referring back to FIG. 1, reference numeral 102 denotes a memory, which comprises a RAM, and stores an input image, feature extraction results of a middle layer, final detection result, and the like. As the memory 102, an SRAM (Static RAM) that allows high-speed random accesses is preferably used to speed up the convolution calculations.

Reference numeral 103 denotes a memory access control unit, which generates addresses for the memory 102, and executes read/write signal control, direction control of a data bus, and the like. The memory access control unit 103 accesses the memory in accordance with outputs from ring buffer setting units 104-1 to 104-n.

Reference numerals 104-1 to 104-n denote ring buffer setting units required to use the memory 102 as independent ring buffers for respective logical processing nodes of the CNN calculations. Arbitrary one of the ring buffer setting units will be described as a ring buffer setting unit 104 hereinafter. The ring buffer setting unit 104 comprises a ring size setting unit 106 for setting the size of a ring buffer, a ring counter 105 for holding the operation status of the ring buffer, an offset address setting unit 107 for determining a physical address on the memory 102, and the like. Ring counter values and offset address values as the outputs from the ring buffer setting units 104-1 to 104-n are selected by selectors 1121 and 1122.

Reference numeral 108 denotes a network composition management unit, which determines the composition for implementing the logical hierarchical network processing using one calculation unit 101 and its operation. A network composition information setting unit 110 holds, as table data (composition information table), composition information that designates a logical layer interconnection relationship of the hierarchical network. This composition information table comprises a register or RAM. The network composition management unit 108 incorporates a sequencer, which controls the operations of the memory access control unit 103 and calculation unit 101 in accordance with this composition information table. A sequence control unit 109 to be described below executes sequence control for respective lines, but the sequencer in the network composition management unit 108 controls the sequence required for a logical processing node to process a calculation for one line.

Reference numeral 109 denotes a sequence control unit, which controls the calculation processing order for respective predetermined calculation processing units in accordance with sequence information described in a sequence information setting unit 111. As described above using FIGS. 22A and 22B, the predetermined calculation processing unit in this embodiment is for one row in the horizontal direction. Therefore, the sequence control unit 109 controls the processing order for executing the processing of a plurality of processing nodes while switching logical processing nodes in a time-sharing fashion, e.g., for respective lines. The sequence information setting unit 111 comprises a RAM or the like, which holds the sequence information.

Reference numeral 113 denotes a CPU bus access control unit, which is a bus interface required for the CPU 68 to access various registers and memories in the CNN processing unit 63. The CPU 68 writes various setting data in the CNN processing unit 63 via this interface. Note that the setting data to be written includes the buffer sizes in the ring size setting units 106, the composition information table in the network composition information setting unit 110, and the sequence information in the sequence information setting unit 111. Also, the CPU 68 sets weighting coefficients in the weighting coefficient storage units 1205 (FIG. 12) in the calculation unit 101.

Figure 4:
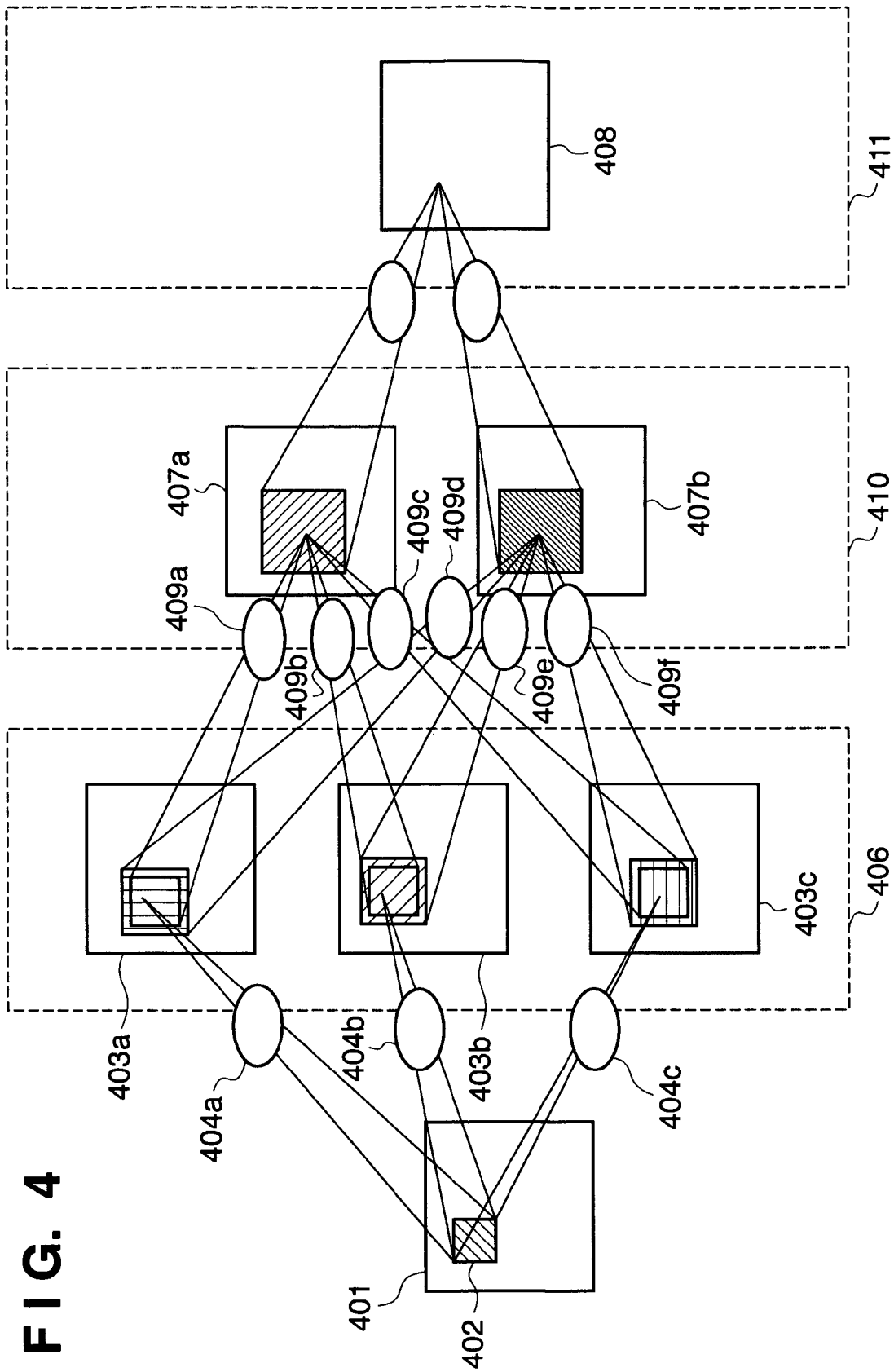
FIG. 4 is a view for explaining an example of the network composition of CNN.
Figure 5:
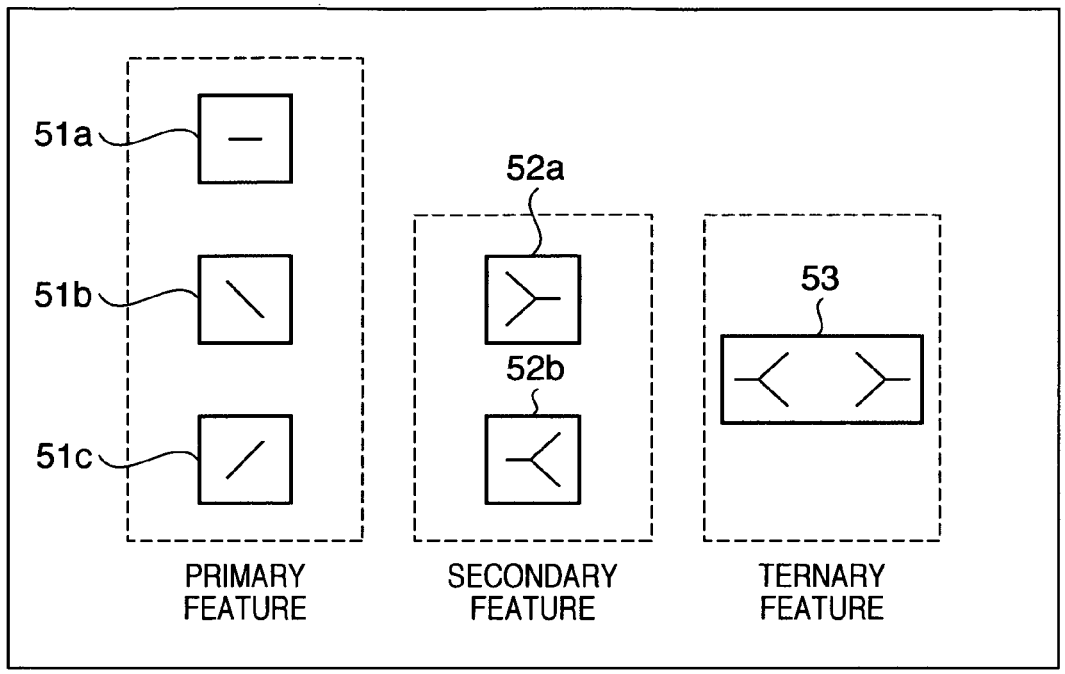
FIG. 5 is a view for explaining an example of feature extraction of the CNN.
Figure 7:
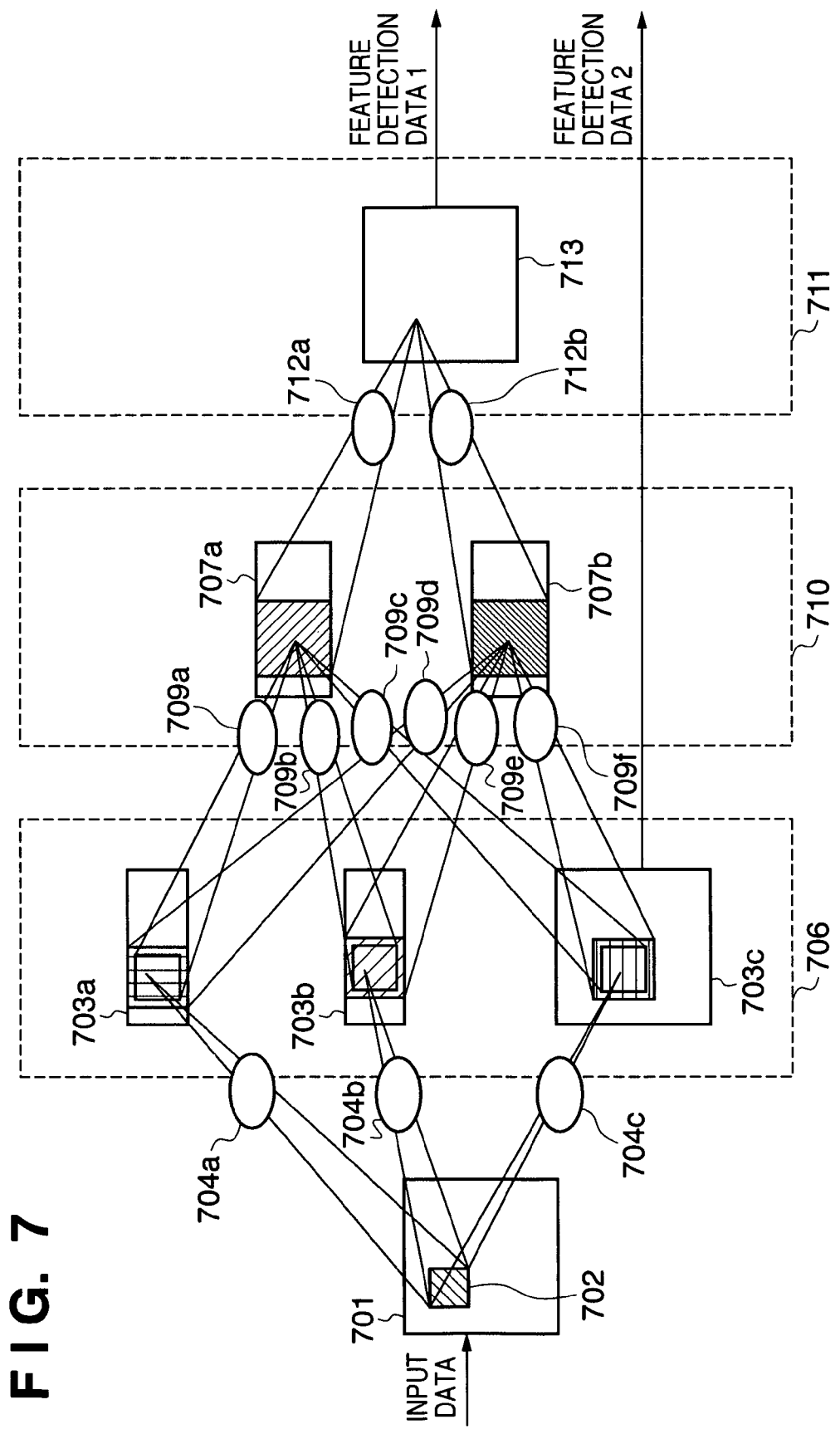
FIG. 7 is a view for explaining an example of the network composition of the CNN according to the first embodiment.

FIG. 7 shows the relationship between the CNN network to be implemented in this embodiment and buffer memories. FIG. 7 is an explanatory view for exemplifying a case in which the CNN network described using FIG. 4 is applied to the CNN processing unit 63 of this embodiment.

Referring to FIG. 7, reference numeral 701 denotes an input layer, which is detection target image data having a predetermined size. Reference numerals 703a to 703c denote ring buffers which store feature planes as calculation outputs of a first layer 706. In FIG. 7, the sizes of the ring buffers 703a to 703c correspond to those of partial areas of the memory, which are allocated to store respective feature planes. That is, feature planes as the calculation results of convolution kernels 704a to 704c (convolution calculations and nonlinear transformation) for the input layer 701 are stored in the partial areas (ring buffers 703a to 703c) of the memory, which have independent sizes. As will be described later, this partial area is controlled as a ring buffer. The feature planes as the calculation result of the first layer 706 are data planes each having the same size as the input layer 701, and are stored in the ring buffers 703a and 703b having a predetermined height. These ring buffers are band buffers which have the same width as the input image and are circulated for respective lines.

FIGS. 13A to 13D are explanatory views illustrating the operation of the ring buffer of this embodiment. Assume that the height (circular number) of the ring buffer is 6 for the sake of descriptive convenience. Also, a case will be exemplified below wherein a ring buffer for six lines refers to image data 1300 for eight lines L1 to L8 input in the raster-scan order. Reference numeral 1301 denotes a state in which the ring buffer is full of data for six lines. In this case, the value of the ring counter 105 circulates from "0" to "5", and it is "5" in case of the storage state 1301. In the next processing unit, line L7 is stored in the first row of the ring buffer, and the value of the ring counter 105 becomes "0". In this case, the ring buffer has a storage state 1302, and can refer to lines L2 to L7. In the still next processing unit, line L8 is stored in the second row position, and the value of the ring counter 105 becomes "1". In this case, the ring buffer has a storage state 1303, and can refer to lines L3 to L8. In this way, the ring buffer circulates to have, as a unit, a memory area corresponding to the amount of the calculation result obtained when each processing node executes a calculation of a predetermined processing unit. That is, the ring counter 105 holds the circulate position indicating the write destination of calculation result data. Since such ring counters 105 are provided in association with a plurality of processing nodes that compose the network calculations, the circulate positions indicating the write destinations of calculation result data are held for respective processing nodes.

In this embodiment, the height (circular number) of the ring buffer is determined depending on the sizes of all the convolution kernels connected to the subsequent stage. For example, in case of the ring buffer 703a, a larger value of the heights (vertical sizes) of convolution kernels 709a and 709d is determined as the ring buffer height. Likewise, the heights of the ring buffers 703b and 703c are respectively determined based on the kernel sizes of convolution kernels 709b and 709e, and convolution kernels 709c and 709f.

In ring buffers 707a and 707b used to store the feature planes as the calculation results of a second layer 710, the heights of convolution kernels 712a and 712b assume a larger value of the heights of the ring buffers. Note that the size of the ring buffer 703c may be specified by the kernel size. However, in this embodiment, since the ring buffer 703c stores feature detection data used by the CPU 68 for determination processing, a buffer having the same size as input image data is allocated as the ring buffer 703c. The CPU 68 determines the existence of a detection target image with reference to a feature plane of a final layer 711 stored in a buffer 713, and that of the first layer 706 held in the ring buffer 703c.

In this way, according to this embodiment, the ring buffers 703a, 703b, 703c, 707a, and 707b used to hold the feature planes of the middle layer are assigned to memory areas with different sizes in accordance with the network interconnection state and intended purpose. In this way, the memory size required upon implementation of the CNN network is minimized.

Figure 8B:
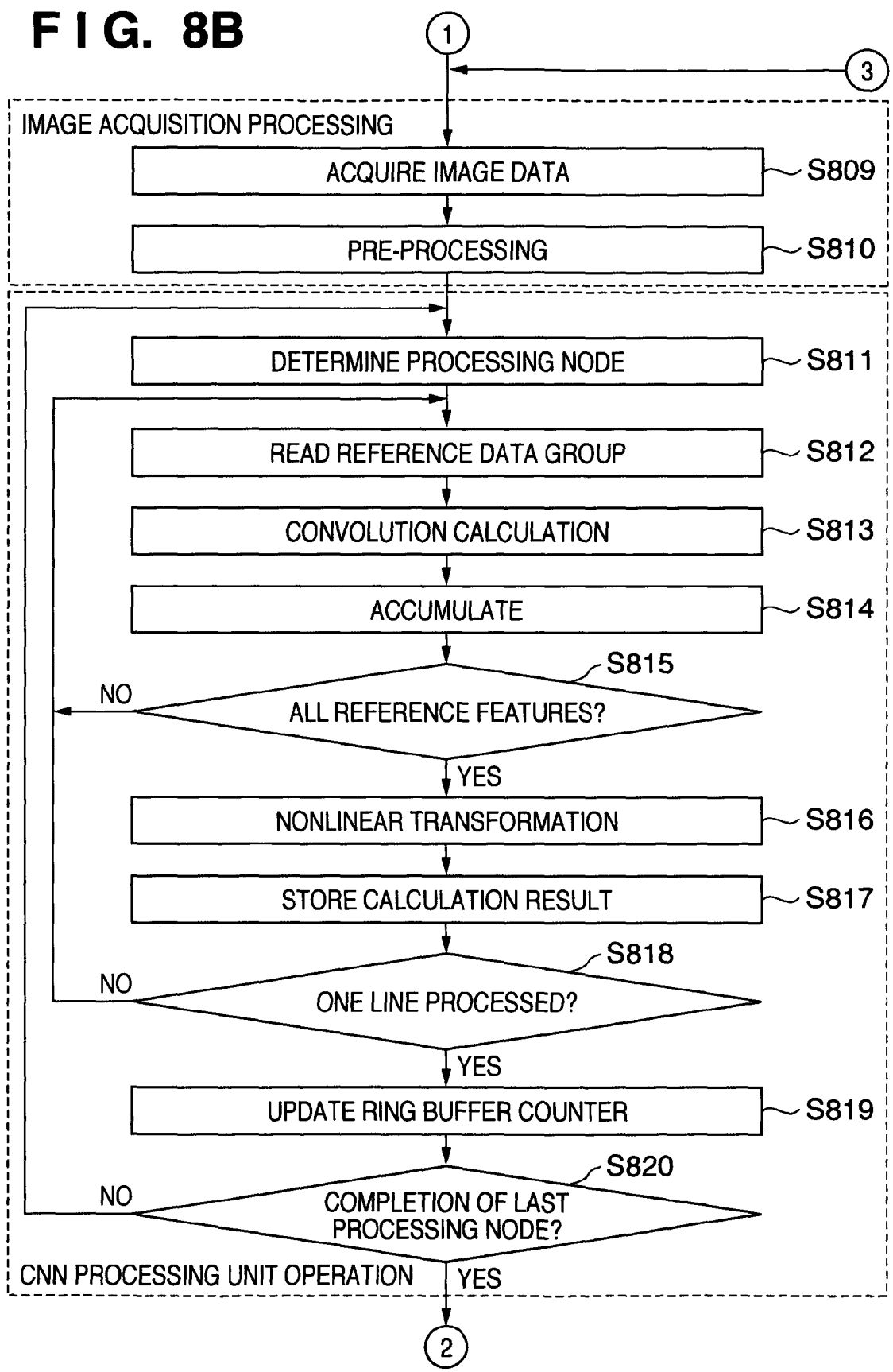

The operation of this embodiment will be described in detail below with reference to the flowchart shown in FIGS. 8A and 8B. FIGS. 8A and 8B describe the operations of the CPU 68 and CNN processing unit 63 in a single flowchart. The routine (steps S811 to S820) that clearly specifies "CNN processing unit operation" in FIG. 8B indicates the operation of the CNN processing unit 63.

In step S801, the CPU 68 executes various kinds of initialization processing prior to the start of detection processing. Respective processing units initialize internal registers, memories, and the like in response to an initialization instruction from the CPU 68.

In step S802, the CPU 68 selects a detection target (detection target image data). In this case, a desired detection target is selected from those which are prepared in advance. The CNN processing unit 63 of this embodiment composes various CNN using identical hardware components by replacing the weighting coefficients of convolution kernels, sequence information, network composition information, and the like, thus coping with various detection targets.

After that, the CPU 68 accesses the CNN processing unit 63 via the bridge 65 and image bus 64, and sets data in predetermined registers and memories via the CPU bus access control unit 113. After the detection target is determined, the CPU 68 sets weighting coefficients according to the determined detection target in the weighting coefficient storage unit 1205 in the calculation unit 101 in step S803. Note that the weighting coefficients are coefficient data of the convolution kernels generated by learning for each detection target.

In step S804, the CPU 68 sets network composition information in the network composition information setting unit 110 of the network composition management unit 108. The network composition information is a composition information table that designates the interconnection of the network. As the network composition information, different data is set in accordance with the detection target as in the weighting coefficients.

FIG. 9 shows an example of the data configuration of the network composition information (network composition information table). Referring to FIG. 9, "designated processing node" corresponds to a processing node of the logical network shown in FIG. 7, and first to sixth processing nodes are logical processing nodes for respectively calculating feature planes. The feature planes calculated by the first to sixth processing nodes are respectively stored in the ring buffers 703a to 703c, 707a, 707b, and 713. The logical processing nodes are logical calculation processing units implemented by exploiting the calculation unit 101 in a time-sharing fashion. The network shown in FIG. 9 can be implemented by a logical network structure shown in FIG. 14. In FIG. 14, a zeroth processing node corresponds to the input image data plane, and does not execute any calculations in practice.

The "number of connected nodes" indicates the number of connections of the lower layer required by a processing node upon calculation. For example, the fourth processing node is connected to the lower layer of three processing nodes. The internal sequencer of the network composition management unit 108 controls memory accesses and calculations in accordance with the number of connections.

"Adjacent lower layer processing node" is information that designates processing nodes of the lower layer (those connected to the previous stage) required for a processing node upon calculation. For example, the fourth processing node is connected to the first, second, and third processing nodes. That is, upon calculation of the fourth processing nodes, the calculation results of the first to third processing nodes (the feature planes held in the ring buffers 703*a* to 703*c*) are used as reference data.

"Calculation type" is information indicating the type of calculation to be executed, and in case of the CNN calculations, weighting coefficients are selected in accordance with the calculation type. When the calculation unit 101 has the arrangement shown in FIG. 12, a calculation type number described in "calculation type" corresponds to "kernel selection signal" used to make the coefficient selector 1204 select weighting coefficients. Note that in case of the CNN processing, different calculations (convolution calculations of different weighting coefficients) are executed for respective processing nodes.

In the network composition information table in FIG. 9, "reference data width" corresponds to the width of a convolution kernel corresponding to "calculation type", and "reference data height" corresponds to the height of the convolution kernel corresponding to "calculation type".

In step S805, the CPU 68 sets sequence information in the sequence information setting unit 111 of the sequence control unit 109. The sequence information is table information that specifies the sequence operations for respective calculation processing units (for respective lines in this embodiment) to be processed in a time-sharing fashion. FIG. 10 shows an example of the data configuration of the sequence information table. "Sequence number" is a sequence number to be updated for each line, and "processing node number" indicates a logical execution processing node corresponding to the sequence number. That is, calculation processing is executed for a processing node with a processing node number "1" (first processing node) at a sequence number "1", and processing is executed for a processing node with a processing node number "2" at a sequence number "2". Each processing node executes calculations (convolution calculations+nonlinear transformation) to have one line as a processing unit in response to one execution instruction. Therefore, the sequence information specifies the execution order of calculations of predetermined processing units. In this embodiment, input data is two-dimensional image data, and calculation processing of that image data for one line in the horizontal direction is executed as calculation processing for each predetermined processing unit. As a result, the calculation processing corresponding to one sequence number acquires the calculation result for one line in the horizontal direction, and that calculation result is held in a partial area of the memory 102 corresponding to that processing node. In the memory 102, a ring buffer which circulates the write destinations of data to have a memory area for one line as a unit is formed in the partial area allocated in correspondence with each individual processing node.

Figure 11:
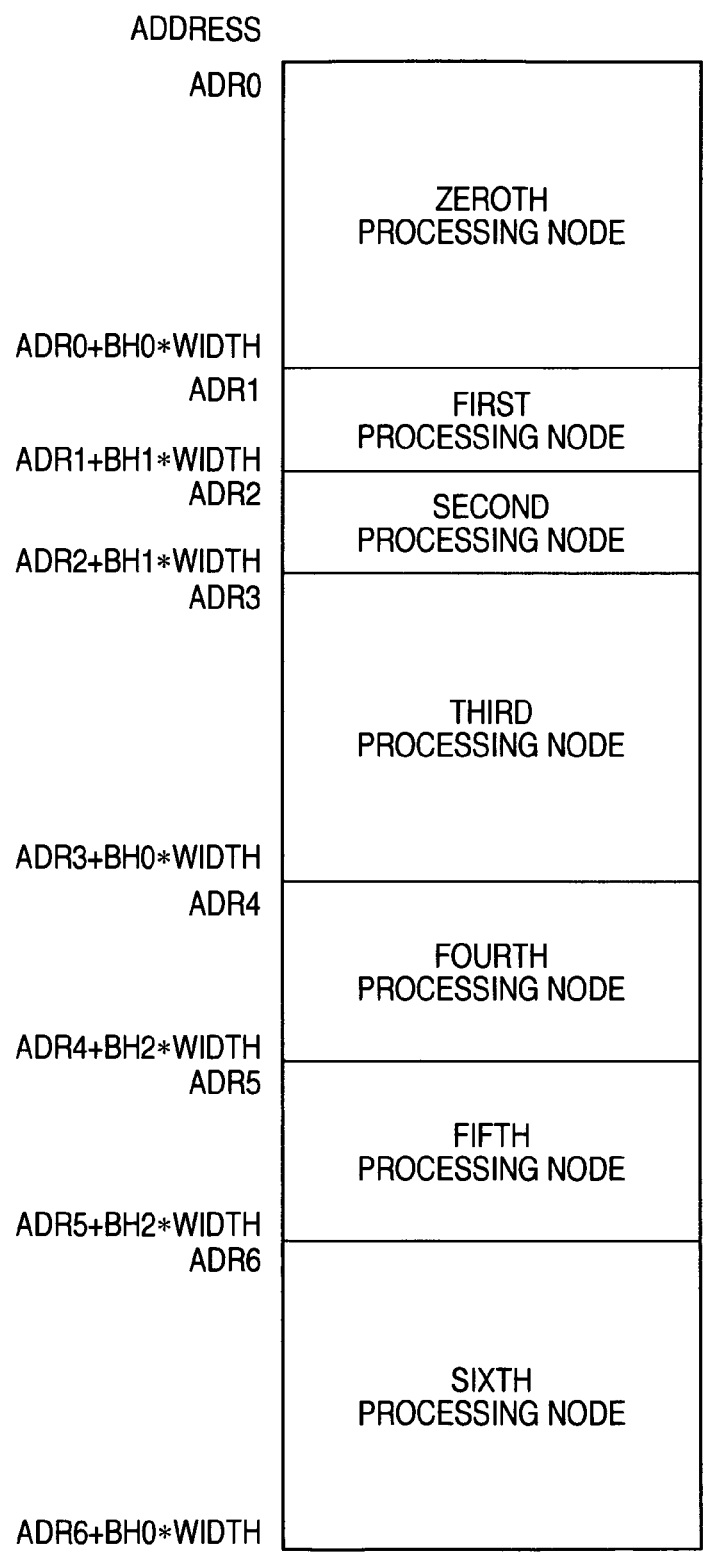
FIG. 11 is a view for explaining memory allocations.

In steps S806 and S807, the CPU 68 sets information required for the operations of the ring buffers. In this embodiment, the CPU 68 determines allocations of the band buffers to the memory 102, and the heights of the band buffers (the circular numbers of the ring buffers) in accordance with the logical connection state of the plurality of processing nodes in the network calculations. More specifically, the CPU 68 sets information required for the operations of the ring buffers in register sets (ring buffer setting units 104) as many as the number of logical processing nodes. In case of the network structure indicated by the network composition information table shown in FIG. 9, the CPU 68 sets predetermined values in six ring buffer setting units (units 104-1 to 104-6). The CPU 68 sets the heights (the circular numbers of the ring counters) of the ring buffers of the corresponding logical processing nodes in the ring size setting units 106. The CPU 68 sets ring buffer start addresses of the corresponding processing nodes in the offset address setting units 107. FIG. 11 is the memory map showing the relationship among the processing nodes, offset addresses, and heights of the ring buffers (band buffers) upon implementing the network shown in FIG. 7. In FIG. 11, "ADRx (x: 0 to 6)" corresponds to the offset address, and "BHx (x: 0 to 2)" corresponds to the height of the ring buffer (the actual setting value is "height—1"). Also, "WIDTH" indicates the width of image data. Note that the zeroth processing node is a frame buffer area for holding input image data.

In this embodiment, the memory 102 is divided into a plurality of areas as described above, and the respective areas are used as the ring buffers or frame buffers having different sizes. For example, in case of the calculation processing shown in FIG. 7, the first and second processing nodes use the buffers of BH1, the zeroth, third, and sixth processing nodes use the buffers of BH0, and the fourth and fifth processing nodes use the buffers of BH2. BH0 is the height corresponding to the frame memory (i.e., the same as the height of the input image data). That is, the circular numbers of the ring buffers allocated to the processing nodes are determined based on the sizes of reference data to be referred to by the processing nodes upon execution of the calculations of the predetermined processing unit. As described above, in step S806 the CPU 68 configures the ring buffers in accordance with the calculation processing contents and the hierarchical connection relationship of the respective processing nodes in the network calculations to be executed.

Upon completion of various settings, the process advances to step S808. In step S808, the CPU 68 instructs the image input unit 61, pre-processing unit 62, and CNN processing unit 63 to start processing (calculations). In step S809, upon reception of the processing start instruction from the CPU 68, the image input unit 61 acquires image data for one frame, and stores the acquired image data in an internal buffer (not shown). Upon completion of storage, the image input unit 61 generates an image acquisition completion interrupt to the CPU 68. Upon detection of the image acquisition completion interrupt in step S810, the CPU 68 launches the DMAC 66 to transfer the image data acquired in step S809 to an internal memory (not shown) of the pre-processing unit 62. Upon completion of transfer of the image data, the pre-processing unit 62 starts pre-processing. The pre-processing unit 62 corrects the contrast of the image data in accordance with contrast correction information designated in advance. Upon completion of the correction processing, the pre-processing unit 62 generates an interrupt to the CPU 68. Upon detection of the interrupt, the CPU 68 launches the DMAC 66 to transfer the corrected image data to the memory 102 in the CNN processing unit 63. Upon completion of transfer of the corrected image data to the memory 102, the CNN processing unit 63 starts detection processing.

Steps S811 to S820 correspond to the routine associated with the hardware processing of the CNN processing unit 63.

In step S811, the sequence control unit 109 determines a processing node which is to execute calculations. The sequence control unit 109 determines a processing node in accordance with the sequence information table held in the sequence information setting unit 111. For example, in case of the sequence information table shown in FIG. 10, the sequence control unit 109 selects a processing node number "1" in the first sequence. The sequence control unit 109 has a sequence counter which counts a sequence count, and counts up the sequence counter for each sequence unit (for each processing of a line unit in this case). The sequence control unit 109 determines a processing node as a processing target by referring to the sequence information table shown in FIG. 10 using the sequence counter as an address.

In step S812, reference data required for the calculations of the processing node determined as the processing target are read out from the memory 102, and are set in the calculation unit 101.

The network composition management unit 108 selects a ring buffer setting unit corresponding to the reference data from the ring buffer setting units 104-1 to 104-n in accordance with sequence instruction information output from the sequence control unit 109. For example, if the first processing node is selected in step S811, the sequence control unit 109 determines "number of connected nodes=1" and "connection source processing node=zeroth processing node", and "calculation type=1" in accordance with the contents of the network composition information table shown in FIG. 9. The network composition management unit 108 outputs a node selection signal in accordance with the contents of the network composition information table, and selects the outputs from the ring buffer setting unit 104 corresponding to the reference data. In this case, the unit 108 outputs a selection signal corresponding to the zeroth processing node. The memory access control unit 103 generates a start address of the memory to be read out in accordance with the information of the selected ring buffer setting unit 104.

Figure 15:
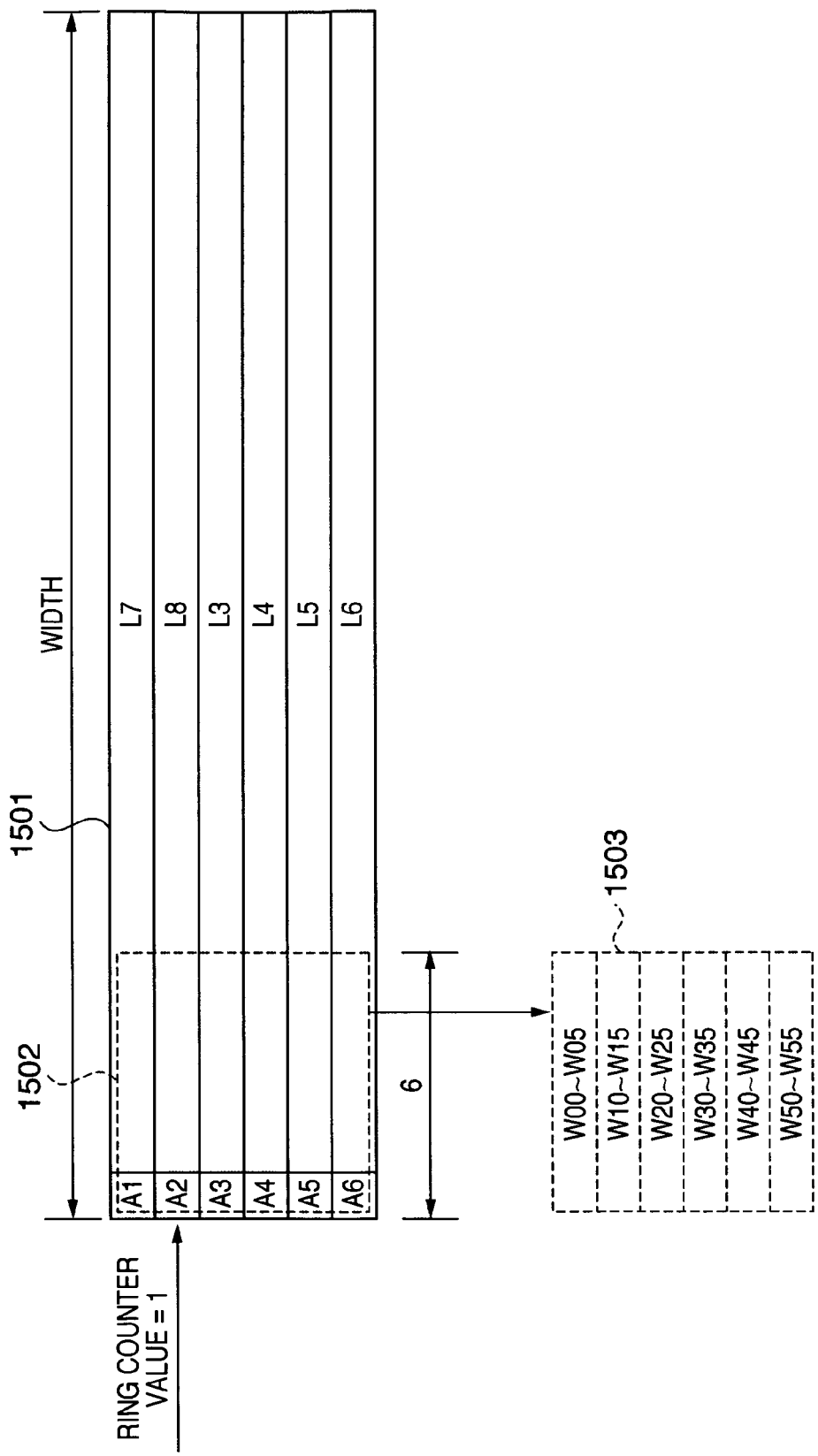
FIG. 15 is a view for explaining the read process of a reference data group.
Figure 16:
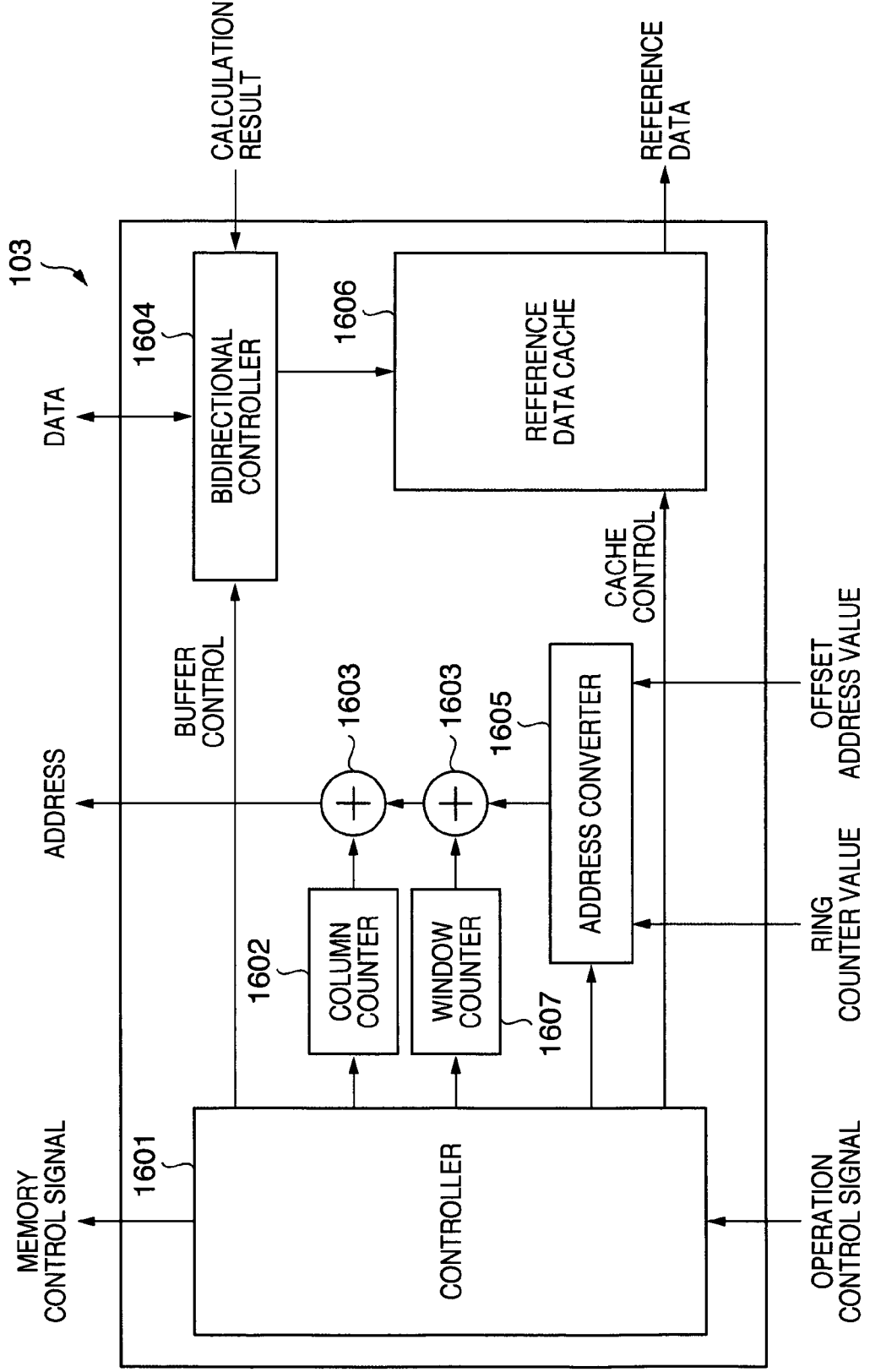
FIG. 16 is a block diagram for explaining the arrangement of a memory access control unit 103.

FIG. 16 is a block diagram for explaining the internal arrangement of the memory access control unit 103. Reference numeral 1601 denotes a controller, which generates signals to the respective processing units and a memory control signal to the memory 102 in accordance with an operation control signal output from the network composition management unit 108. The memory control signal is, for example, a read/write signal with respect to the memory 102. Reference numeral 1602 denotes a column counter, which counts the number of pixels in the row directions (at column positions). Reference numeral 1607 denotes a window counter, which corresponds to a reference window width (a size 1502 in FIG. 15) upon reading out a plurality of reference pixels which are successive in the column number direction (horizontal direction). This reference window width corresponds to the width of a convolution kernel. When the window counter 1607 counts the number of pixels corresponding to the reference window width, its count value is updated to indicate a pixel of the next row of the reference window width. Therefore, an adder 1603 adds row start address values generated by the column counter 1602, the window counter 1607, and an address converter 1605, thereby generating an address required to access data for one row (an address required to designate a row).

Note that count values are set in the column counter 1602 and window counter 1607 every time the calculation type is changed in accordance with the contents of the network composition information table (FIG. 9) held by the network composition management unit 108.

A bidirectional controller 1604 is a buffer which executes bidirectional control of a data bus with the memory 102 in accordance with a buffer control signal output from the controller 1601. A reference data cache 1606 is a cache memory which temporarily holds reference data required for the convolution calculations. Reference data read out from the memory 102 based on the aforementioned address conversion result are stored in the reference data cache 1606. The controller 1601 caches reference data successive in the column number direction (horizontal direction) by controlling the reference data cache 1606 while updating the window counter 1607. The calculation unit 101 executes the convolution calculations while sequentially reading out the reference data stored in the cache.

FIG. 15 is a view for explaining the reference data read-out operation of the memory access control unit 103. The operation of the memory access control unit 103 will be described in more detail below with reference to FIGS. 16 and 15.

Referring to FIG. 15, reference numeral 1501 denotes a ring buffer (band buffer which is used by circulating for respective lines) allocated to a certain processing node. Reference numeral 1502 denotes a size corresponding to a reference window of a convolution kernel to be calculated. Furthermore, reference numeral 1503 denotes a weighting coefficient array set of the convolution kernel. A case in which the convolution kernel size is 6×6 will be described below. In the weighting coefficient array set 1503, W00 to W05 indicate a weighting coefficient array for a data array of the first row, W10 to W15 indicate that for a data array of the second row, and weighting coefficient arrays for respective data arrays are similarly listed. Upon execution of the convolution calculations, product-sum calculation processing of the coefficient values and reference data at corresponding positions is executed.

"WIDTH" indicates the width of a feature plane (i.e., it corresponds to the width of input image data in case of this embodiment), L3 to L8 indicate line data of the third to eighth rows of the feature plane. A1 to A6 indicate start memory addresses of the corresponding lines on the band buffer.

The address converter 1605 of the memory access control unit 103 calculates the start address of reference data based on the ring counter value of the ring counter 105 and the offset address value of the offset address setting unit 107, which are selected by the selectors 1121 and 1122. Note that the "offset address value" corresponds to A1 in FIG. 15. The ring counter value is a pointer which points to a row where the last processing line until now is held. For example, when the ring counter value is "1", and the height of a filter kernel (=convolution kernel) is "6", the start line of data to be referred to is a line indicated by A3. After the start address is determined, the controller 1601 outputs memory addresses while updating the value of the window counter 1607, and reads out successive reference data of line L3 from the memory 102. That is, the window counter 1607 serves as a counter for reading out reference data successive in the column number direction (horizontal direction). Note that a value corresponding to the width of the reference area (the width−1 in practice) is loaded as count-up data in the window counter 1607. In this case, sixth successive data in the column number direction are read out, and the readout data are stored in the reference data cache 1606. Upon completion of the read-out processing of the data (i.e., upon completion of the count operation corresponding to the width of the reference area), the window counter is reset to indicate the zeroth pixel of the next row. Next, address A4 is generated based on the address value from the address converter 1605 and the count values of the column counter and window counter, and reference data of line L4 in the reference area are similarly stored in the reference data cache 1606. After that, reference data from lines L5 to L8 are sequentially stored in the reference data cache 1606. That is, the memory access control unit 103 detects the start row on the ring buffer based on the ring counter value, and stores reference data of each row corresponding to the width of the reference area in the reference data cache 1606.

Note that the start address of each row to be referred to can be calculated based on:

$$\text{Address}(n) = \text{OffsetAddress} + (\text{mod}(\text{RingCtr} - (\text{FilterHeight} - 1) + \text{RingHeight} + n, \text{RingHeight})) \times \text{WIDTH}$$

where

Address(n): the start address of a reference data row of the n-th line;

n: a line number (ascending order)

OffsetAddress: the offset address value (address corresponding to A1);

RingCtr: the ring counter output value;

RingHeight: the height of the ring buffer;

mod (x, y): the remainder of x with respect to y; and

WIDTH: the width of feature data.

By sequentially incrementing n from 0 to (the height of the filter kernel−1) for respective reference lines in the above equation, the start addresses of the reference lines are acquired.

The above equation is an example of a calculation method for calculating the address of a reference line with reference to the ring counter value. In case of the example shown in FIG. 15, by enumerating the relationship between n and an address in the form of (n, address), we have: (0, A3), (1, A4), (2, A5), (3, A6), (4, A1), and (5, A2). This processing corresponds to designation of the previous lines in the raster-scan order to have the line indicated by the ring counter (the line having A2 as the start address) as the latest address.

The address converter 1605 executes the aforementioned address conversion processing. The start addresses are sequentially generated when the controller 1601 outputs n to the address converter 1605 at predetermined timings. Note that the reference line address acquisition method is not limited to the aforementioned equation, and any other methods may be used. In the example of FIG. 15, the height of the ring buffer is the same as that of the filter kernel. Also, the start addresses can be similarly calculated even when the height of the ring buffer is larger than that of the filter kernel.

Referring back to FIG. 8B, upon completion of caching the reference data group from the memory 102 in the reference data cache 1606, as described above, the process advances from step S812 to step S813. In step S813, the calculation unit 101 starts the convolution calculation processing. That is, the network composition management unit 108 designates the weighting coefficient of the calculation unit 101 in accordance with the "calculation type" information recorded in the network composition information table (FIG. 9), and drives the calculation unit 101. The calculation unit 101 reads out the reference data stored in the reference data cache 1606 of the memory access control unit 103, and executes the convolution calculation processing.

In steps S814 and S815, the results of the convolution calculations executed for all connection source processing nodes (adjacent lower layer processing nodes) are accumulated. These steps will be described in more detail below.

In step S815, the CNN processing unit 63 checks the number of connection source processing nodes. For example, in the example shown in FIG. 9, when the target processing node is the fourth processing node, the number of connection source processing node is 3. In this case, the convolution calculation processing is sequentially executed for the calculation results of the first, second, and third processing nodes in accordance with the contents of the network composition information table, and these calculation processing results are held in the accumulation adder 1202. The read-out processing of reference data for each processing node and the calculation sequence are the same as the aforementioned method. That is, the memory access control unit 103 reads out reference data groups as calculation targets from the memory 102 to the reference data cache 1606 in accordance with information such as ring counter values, offset addresses, and the like, which are different for respective processing nodes. The calculation unit 101 then executes the convolution calculations for the cache data.

Upon completion of the calculations for all the connection source nodes, the process advances from step S815 to step S816, and the nonlinear transformation processor 1203 nonlinearly transforms the output from the accumulation adder 1202. In step S817, the transformation result is stored in the memory 102. The storage processing of the transformation result in the memory 102 will be described in more detail below.

The network composition management unit 108 selects the ring buffer setting unit 104 associated with the local processing node. For example, during calculations of the first processing node, the network composition management unit 108 selects the ring buffer setting unit 104 corresponding to the first processing node. The memory access control unit 103 generates memory addresses to have, as the start address, a row next to that indicated by the ring counter 105 of the selected ring buffer setting unit 104. Note that the controller 1601 resets the window counter 1607 to zero upon execution of the write operation. The memory access control unit 103 writes the calculation result at the generated start address. Upon completion of the write operation, the controller 1601 increments the value of the column counter 1602 by one. The column counter 1602 is incremented by one every time one calculation result is written. Therefore, at the time of the next processing, a reference data group in an area shifted by one column (by a position for one pixel in the horizontal direction) is read out.

Figure 17:
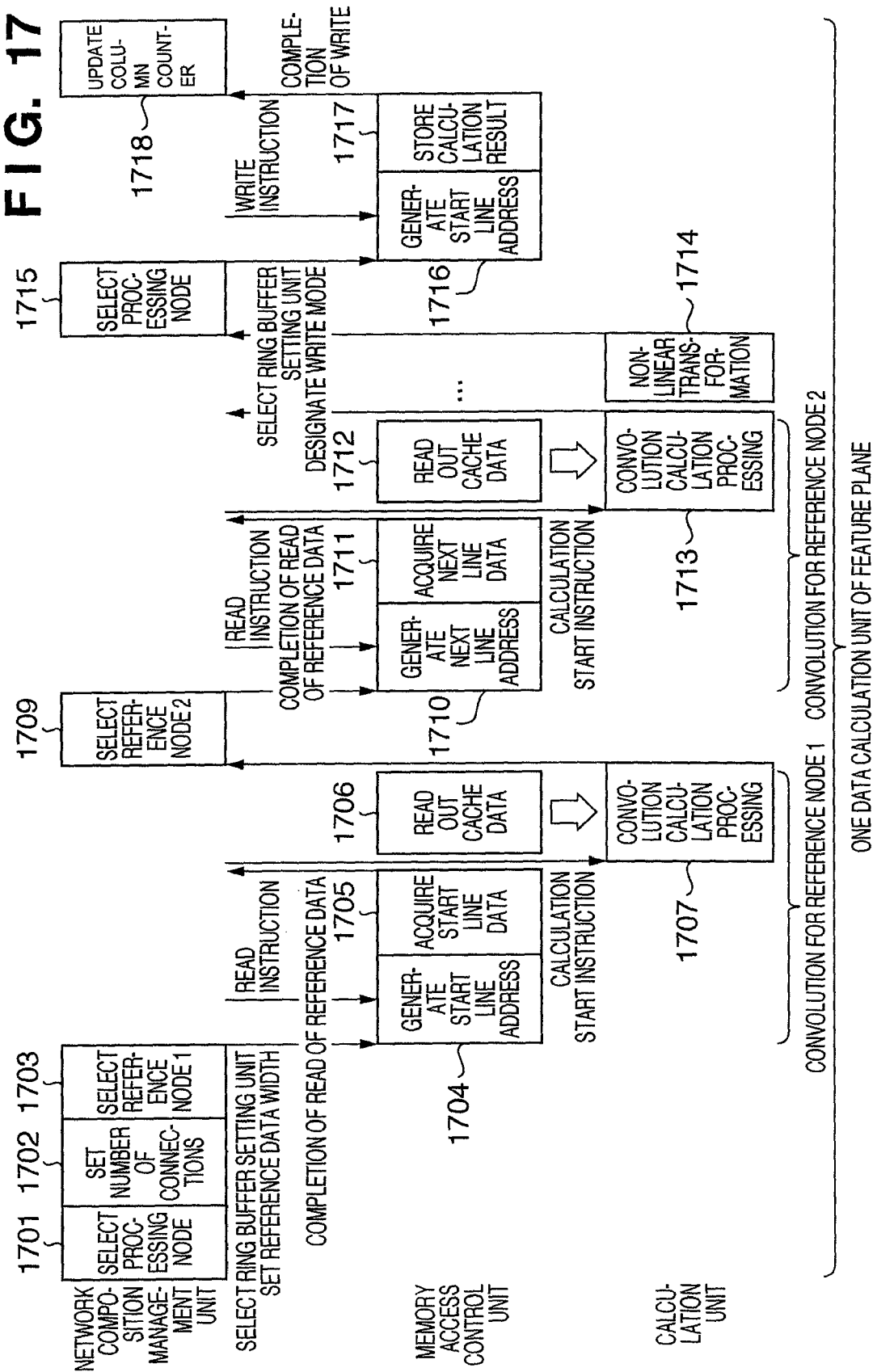
FIG. 17 is a chart for explaining the operation timings for respective CNN calculations.

FIG. 17 is a timing chart of the aforementioned calculation states in correspondence with the network composition management unit 108, memory access control unit 103, and calculation unit 101. The uppermost part shows the operation of the network composition management unit 108, and the memory access control unit 103 and calculation unit 101 execute their processing in accordance with instructions from the network composition management unit 108.

As described above, the network composition management unit 108 selects a processing node in accordance with sequence control instruction information from the sequence control unit 109 (1701). The network composition management unit 108 sets the number of connected nodes with reference to the network composition information table (1702). Subsequently, the network composition management unit 108 notifies the memory access control unit 103 of information (ring counter value, offset address value, etc.) associated with the selected processing node, and instructs the unit 103 to read out reference data (1703). The memory access control unit 103 reads out reference data from the memory 102 using the notified ring counter value and offset address value, and caches them on the reference data cache 1606 (1704, 1705). Upon completion of the read-out operation of the reference data by the memory access control unit 103, the network composition management unit 108 instructs the calculation unit 101 to start calculations. The calculation unit 101 reads out the reference data cached on the reference data cache 1606 and executes the convolution calculation processing (1706, 1707). Upon completion of the convolution calculation processing of the calculation unit 101, the network composition management unit 108 repeats the same processes (1709 to 1713) for the next processing node. Upon completion of the convolution calculations for all adjacent lower layer processing nodes, the network composition management unit 108 controls the calculation unit 101 to execute nonlinear transformation processing (1714), to obtain a calculation result of one pixel on a feature plane. In order to store this calculation result in the memory 102, the network composition management unit 108 notifies the memory access control unit 103 of information (ring counter value, offset address value, etc.) associated with the processing node as the above processing target, and instructs the unit 103 to write the calculation result. The memory access control unit 103 writes the calculation result in a partial area corresponding to that processing node in the memory 102 using the notified ring counter value and offset address value (1716, 1717). In order to execute the aforementioned processes for the next pixel, the column counter 1602 is incremented by one (1718). By repeating the processes 1703 to 1718 for one row, the calculation results for one row of the feature plane are obtained.

Referring back to FIG. 8B, upon completion of the processing for one line by repeating the processes in steps S812 to S817 for one line, i.e., upon completion of the calculation of the predetermined processing unit, the process advances from step S818 to step S819. In step S819, the network composition management unit 108 increments the ring counter 105 of the ring buffer setting unit 104 corresponding to the processing node during processing. The ring counter 105 is updated every time the processing for one line is completed. Note that the ring counter 105 is reset to zero when its count value becomes equal to the value of the ring size setting unit 106. That is, the count value of the ring counter 105 is circulated with reference to the ring size. In this manner, the counter value of the ring counter 105 indicates a memory area as the write destination of the calculation result in the ring buffer, and indicates the circulate state of the ring counter. By processing accesses to the memory 102 along with the operation of the ring counter 105 for respective logical processing nodes in this way, a plurality of partial areas on the memory 102 are independently used as a plurality of ring buffers having different sizes (circular numbers). That is, a plurality of areas on the memory map shown in FIG. 11 are used as ring buffers.

In step S820, the CNN processing unit 63 checks if all the processing nodes complete calculations. In this case, the CNN processing unit 63 checks if all the sequences described in the sequence information table (FIG. 10) are complete. Note that the sequence control unit 109 checks completion by comparing the sequence counter (not shown) with the number of sequences set in advance. If the calculations are not complete yet, the process returns from step S820 to step S811. The sequence control unit 109 updates the sequence counter to acquire the next processing node number to be processed with reference to a table corresponding to the counter value. After the processing node is determined, the network composition management unit 108 starts processing for the next processing node in accordance with sequence instruction information. Upon processing a different processing node, the same operation as the aforementioned processing is repeated except for various parameters associated with a ring buffer and calculations.

Figure 23A:
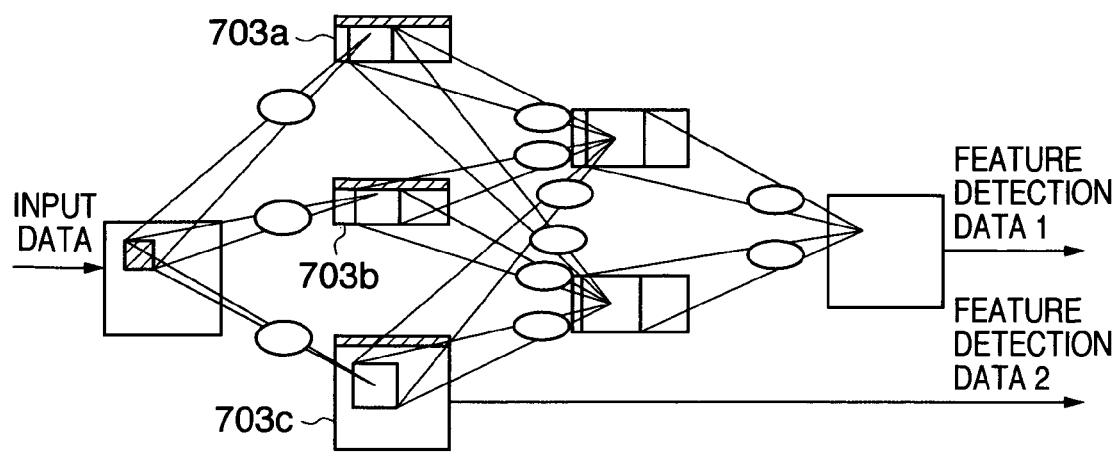
FIGS. 23A to 23C are explanatory views illustrating the progress of calculation processing for respective lines in the hierarchical network shown in FIG. 7.
Figure 23B:
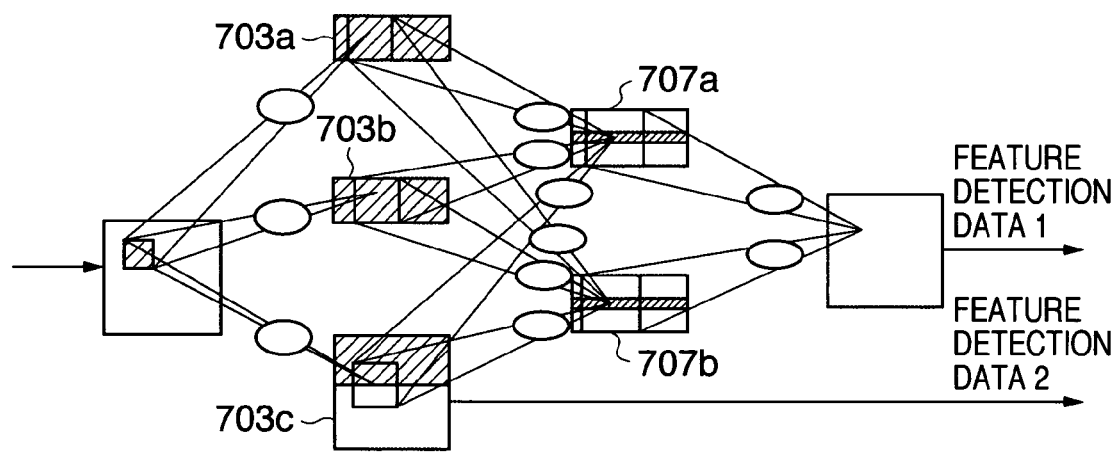
Figure 23C:
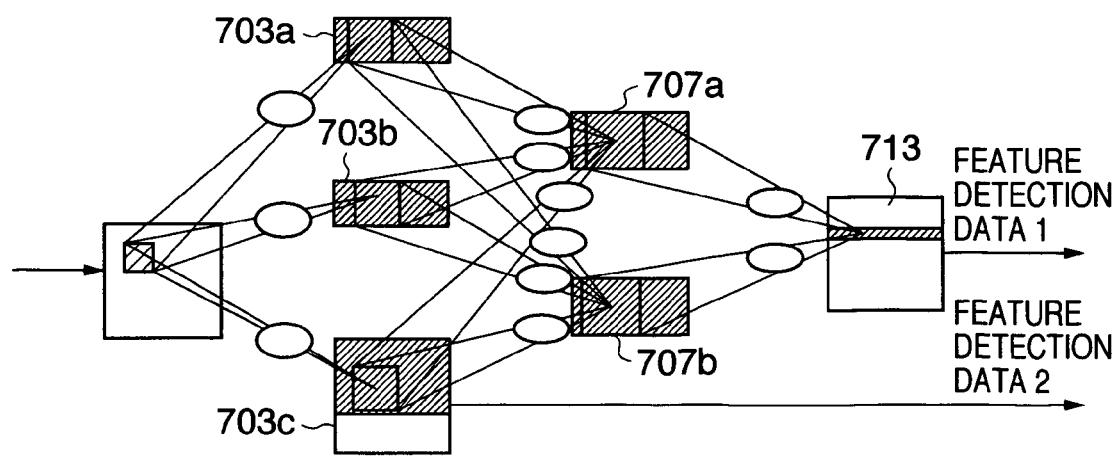

As shown in FIG. 10, the calculation processing progresses while sequentially storing feature data in ring buffers in turn from a lower layer. FIGS. 23A to 23C are explanatory views illustrating the progress of the calculation processing for respective lines in the hierarchical network shown in FIG. 7. In FIGS. 23A to 23C, hatched areas indicate the amounts of processed data on buffers.

The first to third processing nodes for calculating the feature planes of the first layer are repetitively executed for respective lines, and the results are stored in the ring buffers 703a to 703c (the state in FIG. 23A). After the results of the amounts (heights) required to calculate the feature planes of the second layer are stored in the ring buffers 703a to 703c, the first to fifth processing nodes are repetitively executed for respective lines. The ring buffers 703a and 703b sequentially repeat the ring operation, and the ring buffer 703c sequentially stores calculation results. Furthermore, the ring buffers 707a and 707b sequentially store calculation results (the state in FIG. 23B).

After the results of the amounts (heights) required to calculate the feature plane of the third layer are stored in the ring buffers 707a and 707b, the first to sixth processing nodes are repetitively executed for respective lines. In this state, the ring buffers 703a and 703b sequentially repeat the ring operation, and the ring buffer 703c sequentially stores calculation results. Furthermore, the ring buffers 707a and 707b sequentially repeat the ring operation, and the buffer 713 sequentially stores final results for respective lines (the state in FIG. 23C).

By progressing the processing for respective lines in turn from a lower layer in the above sequences, desired final feature data is generated in the buffer 713, and desired intermediate data is generated in the ring buffer 703c.

In this manner, by executing logical processing nodes while switching them for respective lines in a time-sharing fashion, the influence of an overhead due to switching of the processing node is minimized, and the required memory size can be reduced.

By independently controlling the ring buffers for respective processing nodes, arbitrary intermediate data can be held as frame data. In the example shown in FIGS. 23A to 23C, data held in, e.g., the ring buffer 703c corresponds to such frame data.

By repeating the processes in steps S811 to S820, the calculations of respective feature planes based on the predetermined CNN network can be executed for respective lines in a time-sharing fashion. If it is determined in step S820 that the last processing node is complete, for example, the buffer 713 in FIG. 7 stores all data of the feature plane of the final layer. At this time, all data of the feature plane calculated by the third processing node are stored in the ring buffer 703c.

Upon completion of all the sequences (YES in S820), the CNN processing unit 63 generates an interrupt to the CPU 68. Upon detection of this interrupt, the CPU 68 starts checking processing in step S821. That is, the CPU 68 launches the DMAC 66 to transfer feature detection data 1 and 2 (FIG. 7) to the RAM 70. The CPU 68 checks the detection state of a target using the feature data on the RAM 70. The checking processing in step S821 checks the presence/absence of a target by a method of, e.g., binarizing feature data using a predetermined threshold, and acquiring its barycenter. For example, the CPU 68 may use the result of feature detection data 1 to check the presence/absence of a detection target, and may use feature detection data 2 to recognize a texture and the like near the detection target.

If the detection target is changed, the process returns from step S822 to step S802 to re-set various parameters. That is, weighting coefficients, network composition information, and sequence information according to the detection target are respectively updated in steps S803 to S807. Furthermore, the ring counters of the ring buffer setting units 104 are re-set in accordance with the new weighting coefficients and network composition information in steps S806 and S807. In this way, the logical processing nodes execute processing using different areas on the memory 102 as ring buffers with different sizes in accordance with the detection target. That is, the memory map shown in FIG. 11 for the CNN corresponding to the detection target is configured. In this way, according to this embodiment, sequence information is changed based on the connection structure of processing nodes in network calculations which are changed according to a changed detection target, and allocations of partial areas to the processing nodes on the memory 102 are changed.

If the detection target is not changed, the process advances from step S822 to step S823. It is checked in step S823 if the processing is to end. If the processing is not to end, the process advances to step S824. In steps S824 and S825, the CNN processing unit 63 initializes the ring counters 105 of the respective ring buffer setting unit 104, the internal counter of the sequence control unit 109, and the like. The process returns to step S809 to restart the processing from acquisition of image data. That is, the same detection processing is executed for the next frame image. If the detection processing is instructed to end in step S823, this processing ends.

As described above, according to the first embodiment, the ring buffer setting units 104 for controlling the ring buffers are provided for respective logical processing nodes, and the sizes (circular numbers) of the ring buffers are set according to the network composition and intended purpose. In this configuration, the calculations are executed while executing the logical processing nodes for respective lines in a time-sharing fashion. In this manner, the hierarchical calculation processing such as convolutional neural network or the like can be processed at high speed using a minimum memory size.

Furthermore, one hardware or software can process multilayered network calculations of various interconnection relationships (the sizes of interconnection coefficients, interconnected network relationships, required intermediate data) at high speed with a small memory size.

Second Embodiment

The first embodiment has described the configuration in which the sizes of the ring buffers can set for all logical processing nodes. The present invention is not limited to this. For example, the ring buffer sizes may be different for respective layers. That is, the sizes (circular numbers) of ring buffers may be set for respective layers to which processing nodes belong in the network. The second embodiment will explain such configuration.

Figure 18:
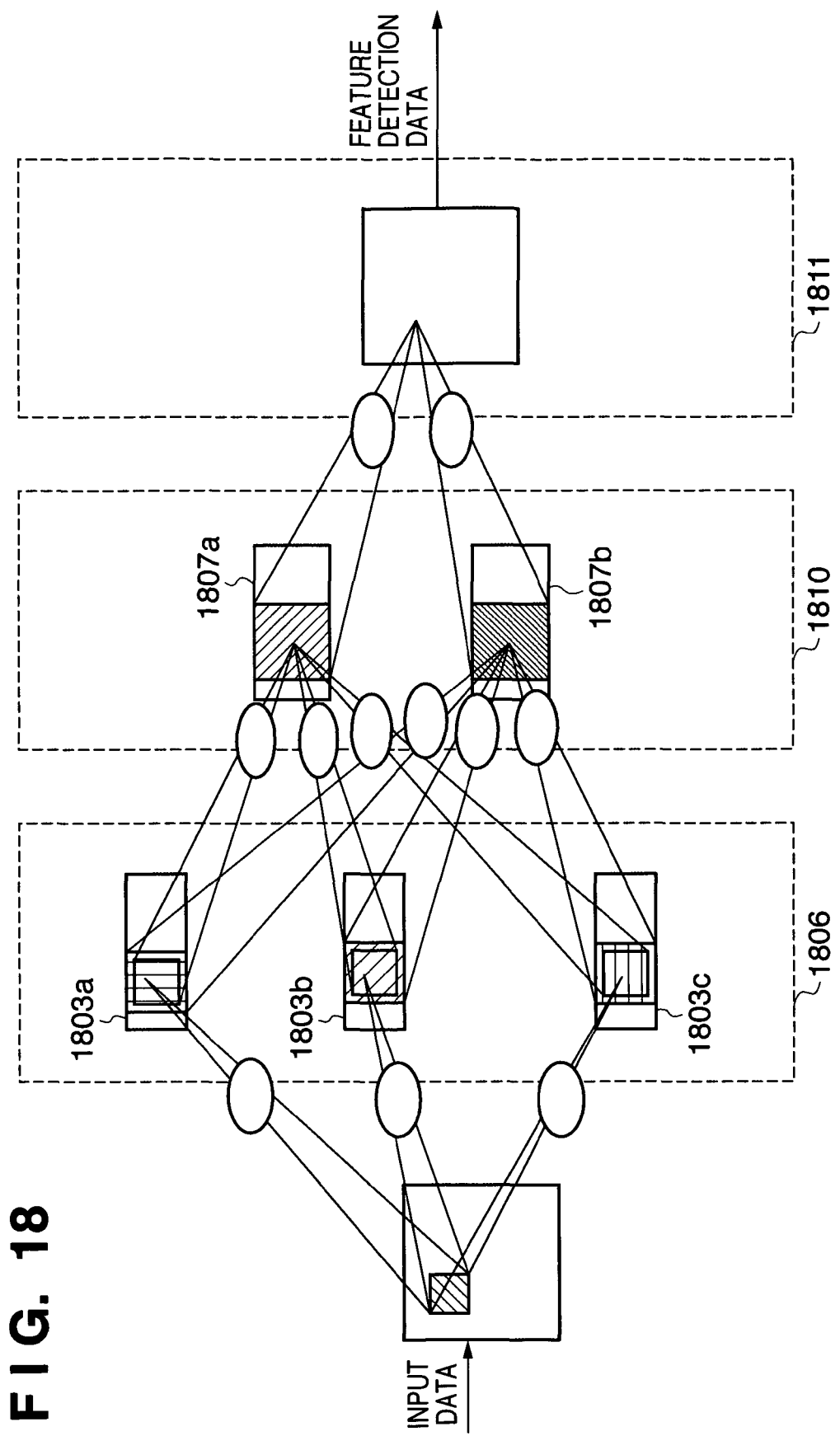
FIG. 18 is a view for explaining the network composition of the CNN according to the second embodiment.
Figure 19:
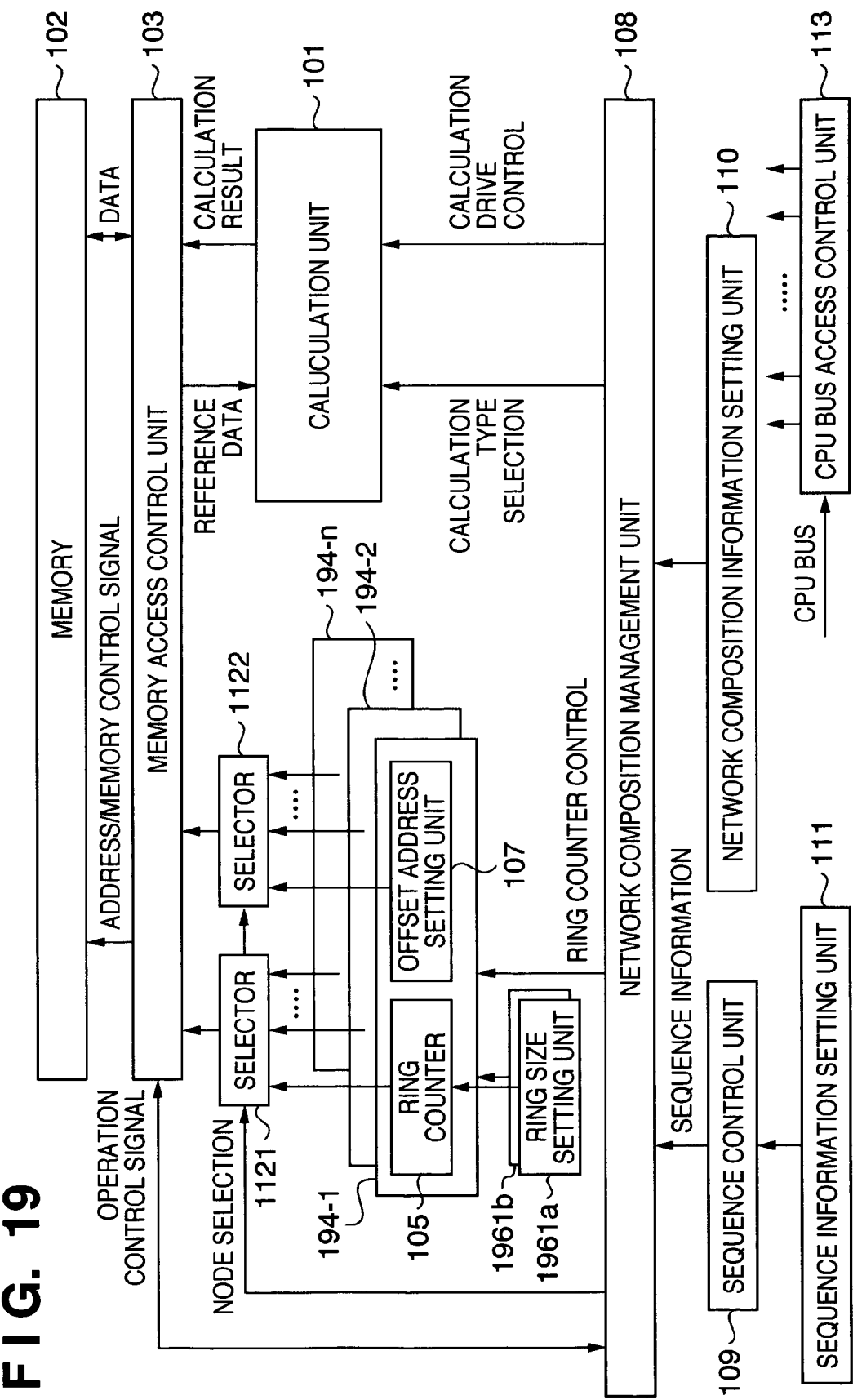
FIG. 19 is a block diagram showing an example of the arrangement of the CNN processing unit according to the second embodiment.

FIG. 19 shows the arrangement of a CNN processing unit 63 when the ring buffer sizes are specified for respective layers. FIG. 18 shows an example of the composition of a CNN network implemented by the CNN processing unit 63 shown in FIG. 19. FIG. 18 shows a state in which ring buffers have different sizes only for respectively layers. That is, buffer memories 1803a to 1803c of a first layer 1806 comprise ring buffers of the same size, and buffer memories 1807a and 1807b of a second layer 1810 comprise ring buffers of the same size. For this reason, in the composition shown in FIG. 18, the ring buffer size of the third feature of the first layer is different from the composition shown in FIG. 7.

In the second embodiment, differences from the first embodiment will be described below. In the second embodiment as well, the CNN processing unit 63 has ring buffer setting units 194-1 to 194-n for respective logical processing nodes, as in the first embodiment. Arbitrary one of the ring buffer setting units will be described as a ring buffer setting unit 194 hereinafter. The ring buffer setting unit 194 comprises a ring counter 105 and offset address setting unit 107.

The CNN processing unit 63 according to the second embodiment comprises ring size setting units 1961a and 1961b provided for respective logical layers. The arrangement including the two ring size setting units 1961a and 1961b can cope with calculations in which the number of layers is up to 3, as shown in FIG. 18.

Figure 20:
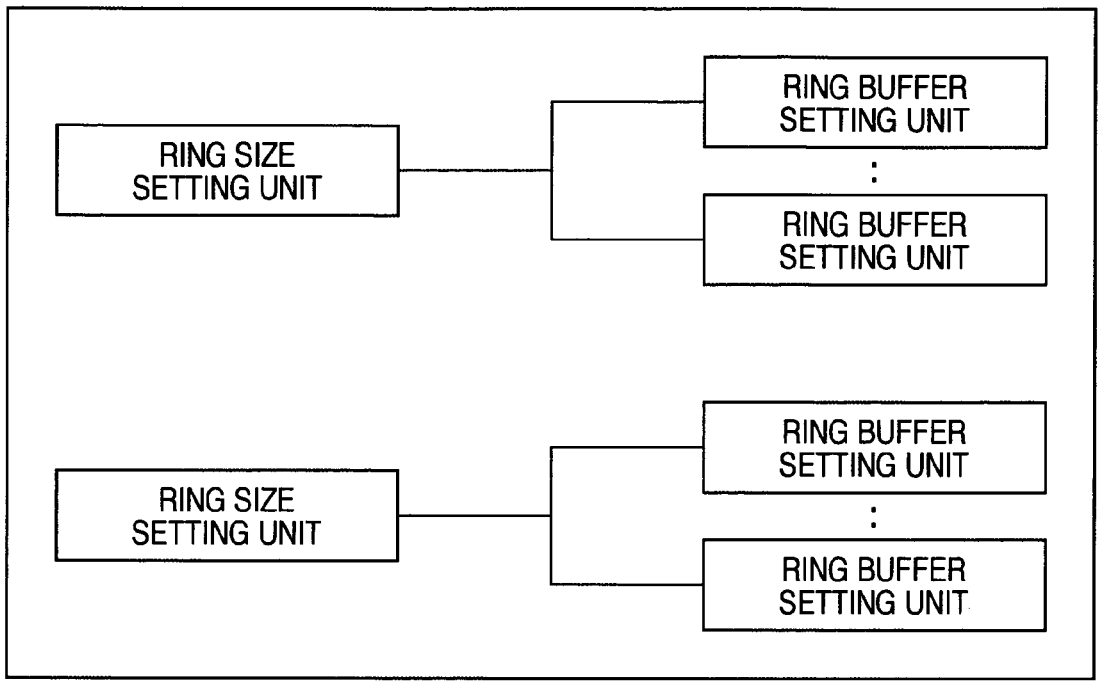
FIG. 20 is a view for explaining the relationship between ring buffer setting units and ring size setting units according to the second embodiment.

Assume that the ring size setting units 1961a and 1961b are connected to the plurality of ring buffer setting units 194. However, one ring size setting unit is connected to each ring buffer setting unit. That is, the ring buffer setting units 194-1 to 194-n are grouped by the ring size setting units 1961a and 1961b. FIG. 20 shows the relationship between the ring size setting units and ring buffer setting units.

Referring to FIG. 18, the ring size setting unit 1961a is connected to the ring buffer setting units used to control the ring buffers of the first layer 1806. The ring size setting unit 1961b is connected to the ring buffer setting units used to control the ring buffers of the second layer 1810. Upon execution of the calculations, the ring buffer setting unit 194 corresponding to a processing node is selected in accordance with a network composition information table held by a network composition management unit 108.

Differences from the first embodiment will be described below using the flowchart of FIGS. 8A and 8B in association with the processing sequence of the second embodiment. In the second embodiment, the ring buffer sizes are set in the ring size setting units 1961a and 1961b for respective layers in step S806. The ring buffer setting units corresponding to a network to be composed are selected from the ring buffer setting units 194-1 to 194-n grouped for respective layers, and offset addresses are set in the selected ring buffer setting units. Upon composing the logical network shown in FIG. 18, values corresponding to the ring buffer heights of the first and second layers are respectively set in the ring size setting units 1961a and 1961b.

Since the subsequent processes are the same as those in the first embodiment, a repetitive description thereof will be avoided. Upon processing the network shown in FIG. 18, the network composition management unit 108 advances the processing while selecting the ring buffer setting unit corresponding to a predetermined logical processing node from the ring buffer setting units 194-1 to 194-n based on the aforementioned settings. In this manner, in the second embodiment, the processing is executed for respective lines as in the first embodiment.

As described above, according to the second embodiment, the number of registers which configure the ring size setting units can be further reduced.

Third Embodiment

Figure 21:
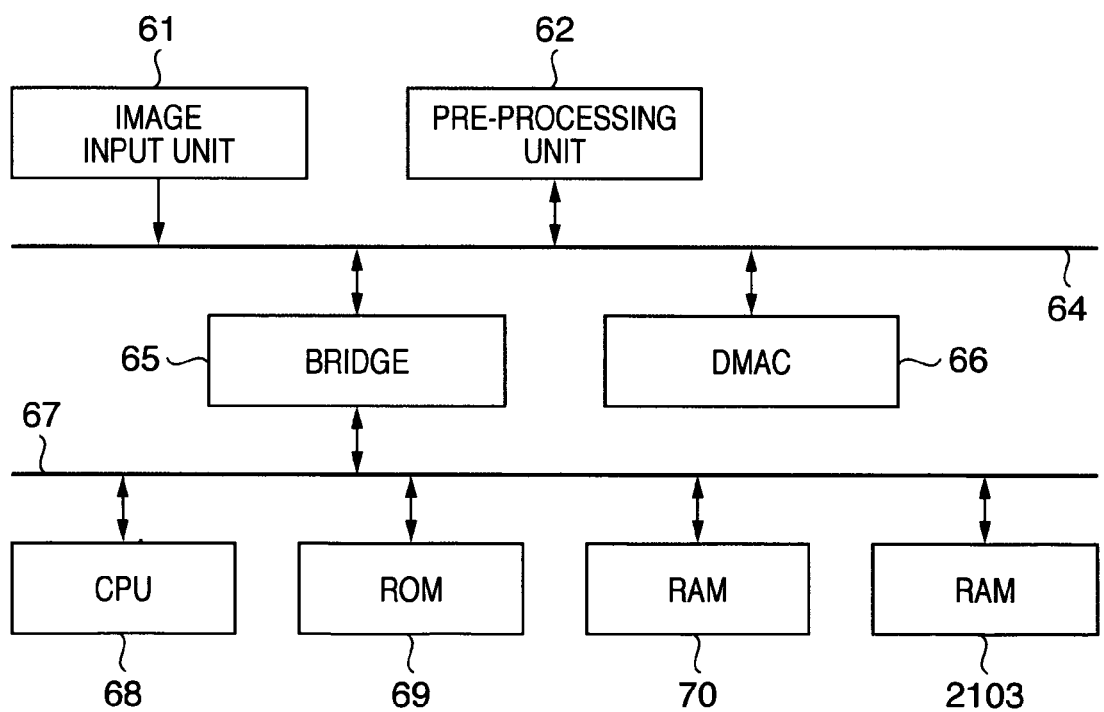
FIG. 21 is a block diagram showing an example of the arrangement of an image processing apparatus (pattern detection apparatus) according to the second embodiment.

In the description of the first and second embodiments, the CNN processing unit 63 is implemented by hardware. However, the present invention can also be applied to software implementation of the CNN processing unit 63. FIG. 21 is a block diagram showing an example of the arrangement of an image processing apparatus (pattern detection apparatus) in case of software implementation. In the arrangement shown in FIG. 21, the CNN processing unit 63 is removed from the arrangement shown in FIG. 6, and a randomly accessible high-speed memory 2103 (to be referred to as a RAM 2103 hereinafter) is added. Differences will be mainly described below.

Upon reception of a processing completion interrupt from a pre-processing unit 62 in step S810, a CPU 68 launches a DMAC 66 to transfer corrected image data stored in a memory of the pre-processing unit 62 to the RAM 2103. The CPU 68 executes processes in steps S811 to S820 for the image data stored in the RAM 2103 by software. In this case, the RAM 2103 is used as a work memory required for the operation of CNN calculation processing. That is, the CPU 68 configures the memory map shown in FIG. 11 on the RAM 2103, and uses areas corresponding to processing nodes as ring buffers.

The ring buffer setting units 104 and the like included in the CNN processing unit 63 of the first embodiment are defined as variables on software, and are assigned onto, e.g., a RAM 70.

In case of the third embodiment as well, as in hardware implementation, the number of buffer memories required for the processing can be reduced. In the arrangement shown in FIG. 21, the RAM 2103 can be implemented using a smaller memory size than general hierarchical network calculations. Also, the same applies to a case in which the RAM 70 is used as a work memory without preparing any RAM 2103.

Other Embodiments

In the above embodiments, the method of allocating a plurality of partial areas corresponding to a plurality of processing nodes to a continuous address space of the memory 102, and using the partial areas of the memory 102 while circulating these areas for respective lines using the ring counter 105 has been explained. However, the present invention is not limited to such specific memory use method. For example, a method of executing processing while assigning discontinuous areas for respective predetermined processing units with reference to a memory address table corresponding to the ring counter may be used. That is, the ring buffer specified in the present invention is not limited to a ring buffer of the narrow sense or a cyclic buffer.

In the above embodiments, the case has been explained wherein logical processing nodes are processed for respective lines in a time-sharing fashion in accordance with the contents of the sequence information table (FIG. 10). However, other methods may be applied. For example, a method of adaptively scheduling processing nodes to be executed in accordance with the use states of read and write buffers may be used.

In the above embodiments, the case has been exemplified wherein the feature extraction result is held at the same resolution as the input layer. However, the present invention can be similarly applied to a configuration in which feature planes (calculation results) are sub-sampled with respect to an input plane.

In the above embodiments, the case has been described wherein sequence control is executed for respective lines as most efficient processing units. However, the present invention is not limited to such specific processing unit. For example, the present invention can be applied to a case in which sequence control is executed for respective units not more than one line or for respective blocks.

The above embodiments have explained application to the convolutional neural network calculations. However, the present invention is not limited to such specific application. The present invention can be applied to various types of hierarchical calculation processing, which require a predetermined reference area. Furthermore, the present invention is not limited to two-dimensional calculations.

In the above embodiments, the case has been explained wherein each ring buffer setting unit 104 or 194 is provided as a register. However, the ring buffer setting unit may be shared by other parameter memories and the memory 102. For example, a predetermined address on the memory 102 may be mapped at a storage destination of data held in the ring buffer setting unit 104 or 194. In this case, circuit resources can be used more effectively. That is, a more flexible network composition can be implemented.

In the above embodiments, the case has been described wherein all two-dimensional reference data are cached in the reference data cache 1606, and the calculation unit 101 is then launched. However, the present invention is not limited to this. In case of the convolution calculations or the like, the calculation unit 101 may be controlled to be driven for each row in the reference window. In this case, upon completion of the read-out processing of reference data in the continuous column number direction (horizontal direction) in response to a decrement of the window counter 1607, the calculation unit 101 is driven before the beginning of the reference data read-out processing of the next line. The calculation unit 101 executes convolution calculations for the readout data. Upon completion of calculations, the reference data read-out processing of the next line starts. The above processing is repeated. In this case, since the reference data cache size suffices to be equal that for the reference data width, hierarchical calculations can be implemented using a smaller cache size.

In the second embodiment, the case has been explained wherein the ring size setting units 1961a and 1961b are provided for respective layers. Instead, a configuration in which the ring buffer setting units 104 are provided for respective layers may be used. In this case, each ring counter is controlled to be updated for each hierarchical processing unit. Although the operation sequences of logical processing nodes are limited (sequences for layer units need to be used), the circuit scale can be reduced.

In the above embodiments, the case has been explained wherein the ring buffer setting units can arbitrary set the ring buffer sizes (when the ring buffers comprise registers or a RAM). However, ring buffer sizes may be set as fixed values in all or some of the ring size setting units.

The embodiments have been explained in detail. The present invention can adopt embodiments in the forms of, for example, a system, apparatus, method, program, storage medium, and the like. The present invention may be applied to either a system constituted by a plurality of devices, or an apparatus consisting of a single device.

Note that the present invention includes a case wherein the aforementioned functions of the embodiments are achieved by directly or remotely supplying a software program to a system or apparatus, and reading out and executing the supplied program code by a computer of that system or apparatus. The program to be supplied in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a computer-readable storage medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the user establishes a connection to a homepage on the Internet using a browser on a client computer, and downloads the computer program of the present invention from the homepage onto a recording medium such as a hard disk or the like. In this case, the program to be downloaded may be a compressed file including an automatic installation function. Also, the program code that forms the program of the present invention may be segmented into a plurality of files, which may be downloaded from different homepages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented in cooperation with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the storage medium is written in a memory equipped on a function expansion board or a function expansion unit, which is inserted in or connected to the computer. In this case, after the program is written in the function expansion board or unit, a CPU equipped on the function expansion board or function expansion unit executes some or all of actual processes based on an instruction of that program.

According to the present invention, the multilayered network in which the calculation units are hierarchically connected via intermediate calculation results can undergo processing with a small-capacity memory at high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-159491, filed Jun. 15, 2007, which is hereby incorporated by reference herein in its entirety.

The invention claimed is:

1. A calculation processing apparatus hierarchically connecting a plurality of logical processing nodes that apply calculation processing to input data, said apparatus comprising:

designation means for sequentially designating a processing node which is to execute calculation processing from the plurality of processing nodes based on sequence information that specifies an execution order of calculations of predetermined processing units to be executed by the plurality of processing nodes;

execution means for executing the calculation processing of the processing node designated by said designation means in the processing unit to obtain a calculation result; and memory control means for allocating ring buffers to the plurality of processing nodes respectively, and writing the calculation result of the processing node obtained by said execution means in the corresponding ring buffer while circulating a write destination of data in units of the amount corresponding to the calculation result of the processing unit.

2. The apparatus according to claim 1, wherein said memory control means determines allocations of the ring buffers to the processing nodes based on a logical connection state of the plurality of processing nodes.

3. The apparatus according to claim 2, wherein said memory control means determines a circular number for each ring buffer allocated to the processing node based on a size of data to be referred to when a processing node connected to a subsequent stage of that processing node executes calculations of the processing unit.

4. The apparatus according to any one of claims 1 to 3, wherein the input data is two-dimensional image data, said execution means acquires a calculation result for one line in a horizontal direction by executing calculation processing to have one line of the image data in the horizontal direction as a unit, and said memory control means circulates the write destination of data to have a memory area for one line in the horizontal direction as a unit.

5. The apparatus according to claim 2, wherein said designation means changes the sequence information in accordance with a change of calculations to be executed, and said memory control means changes the allocations of the ring buffers to the processing nodes based on a connection structure of the processing nodes in the changed calculations.

6. The apparatus according to claim 1, further comprising:

holding means for holding circulate positions indicating the write destinations of the calculation results in the ring buffers in association with the plurality of processing nodes.

7. The apparatus according claim 1, wherein said memory control means unit sets the circular numbers of the ring buffers for respective processing nodes.

8. The apparatus according to claim 1, wherein said memory control means sets the circular numbers of the ring buffers for respective layers to which the processing nodes belong.

9. The apparatus according to claim 1, wherein the ring buffer is a partial area of a memory having a continuous address space, and is shared by allocating different subspaces of the continuous address space to the plurality of processing nodes.

10. The apparatus according to claim 1, wherein the calculation processing is calculation processing of a convolutional neural network.

11. A method of controlling a calculation processing apparatus hierarchically connecting a plurality of logical processing nodes that apply calculation processing to input data, said method comprising:

a designation step of sequentially designating a processing node which is to execute calculation processing from the plurality of processing nodes based on sequence information that specifies an execution order of calculations of predetermined processing units to be executed by the plurality of processing nodes;

an execution step of executing the calculation processing of the processing node designated in the designation step in the processing unit to obtain a calculation result; and a memory control step of allocating ring buffers to the plurality of processing nodes respectively, and writing the calculation result of the processing node obtained in the execution step in the corresponding ring buffer while circulating a write destination of data in units of the amount corresponding to the calculation result of the processing unit.

12. The method according to claim 11, wherein in the memory control step, allocations of the ring buffers to the processing nodes are determined based on a logical connection state of the plurality of processing nodes.

13. The method according to claim 12, wherein in the memory control step, a circular number of each ring buffer allocated to the processing node is determined based on a size of data to be referred to when a processing node connected to a subsequent stage of that processing node executes calculations of the processing unit.

14. The method according to any one of claims 11 to 13, wherein the input data is two-dimensional image data,
in the execution step, a calculation result for one line in a horizontal direction is acquired by executing calculation processing to have one line of the image data in the horizontal direction as a unit, and
in the memory control step, the write destination of data is circulated to have a memory area for one line in the horizontal direction as a unit.

15. The method according to claim 12, wherein in the designation step, the sequence information is changed in accordance with a change of calculations to be executed, and in the memory control step, the allocations of the ring buffers to the processing nodes are changed based on a connection structure of the processing nodes in the changed calculations.

16. The method according to claim 11, further comprising:
a holding step of holding circulate positions indicating the write destinations of the calculation results in the ring buffers in association with the plurality of processing nodes.

17. The method according to any one of claim 11, wherein in the memory control step, the circular numbers of the ring buffers are set for respective processing nodes.

18. The method according to any one of claim 11, wherein in the memory control step, circular numbers of the ring buffers are set for respective layers to which the processing nodes belong.

19. The method according to claim 11, wherein the ring buffer is a partial area of a memory having a continuous address space, and is shared by allocating different subspaces of the continuous address space to the plurality of processing nodes.

20. The method according to claim 11, wherein the calculation processing is calculation processing of a convolutional neural network.

21. A computer-readable storage medium storing a computer program for making a computer execute a control method according to claim 11.

* * * * *